(12) United States Patent
Hartkop et al.

(10) Patent No.: US 12,543,646 B2
(45) Date of Patent: Feb. 10, 2026

(54) AUTOMATIC TRIMMING OF AGRICULTURAL PRODUCTS

(71) Applicant: Farm-Hand AI, Inc., Central Point, OR (US)

(72) Inventors: David Hartkop, Medford, OR (US); Milan Gabriel Young, Central Point, OR (US); Ivan Mccracken, Jackson, OR (US)

(73) Assignee: Farm-Hand AI, Inc., Central Point, OR (US)

( * ) Notice: Subject to any disclaimer, the term of this patent is extended or adjusted under 35 U.S.C. 154(b) by 723 days.

(21) Appl. No.: 17/986,810

(22) Filed: Nov. 14, 2022

(65) Prior Publication Data

US 2023/0371430 A1 Nov. 23, 2023

Related U.S. Application Data

(60) Provisional application No. 63/344,525, filed on May 20, 2022.

(51) Int. Cl.
*A01D 45/06* (2006.01)
*A01D 91/00* (2006.01)

(52) U.S. Cl.
CPC ........... *A01D 45/065* (2013.01); *A01D 91/00* (2013.01)

(58) Field of Classification Search
None
See application file for complete search history.

(56) References Cited

U.S. PATENT DOCUMENTS

2018/0220589 A1* 8/2018 Burden .................. A01G 3/085
2020/0344956 A1* 11/2020 Gowa ..................... G06V 20/10
2022/0394930 A1* 12/2022 Tamblyn ................. A01G 3/08

* cited by examiner

*Primary Examiner* — Heather R Jones
(74) *Attorney, Agent, or Firm* — IP Spring

(57) ABSTRACT

Implementations described herein relate to methods, systems, apparatuses, and computer-readable media for computer-assisted and automatic harvest, sorting, pruning, and trimming of agricultural products. In one implementation, the agricultural product may be a hemp or cannabis product. In one implementation, the agricultural product is automatically pruned through use an artificial intelligence (AI)-generated cutting path. In one implementation, the agricultural product is supported by a clamping assembly. In one implementation, the agricultural product is imaged in a positive-pressure imaging assembly. In one implementation, the agricultural product is automatically trimmed in a positive pressure cutting assembly.

20 Claims, 12 Drawing Sheets

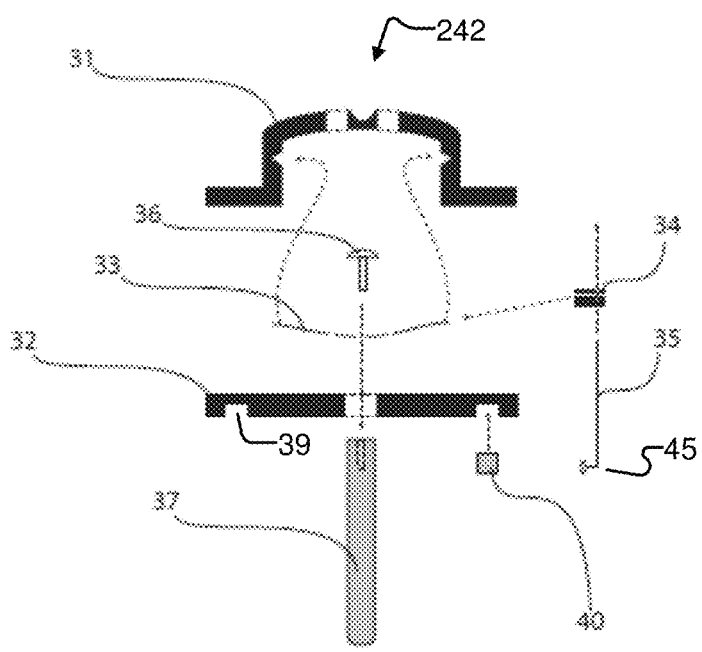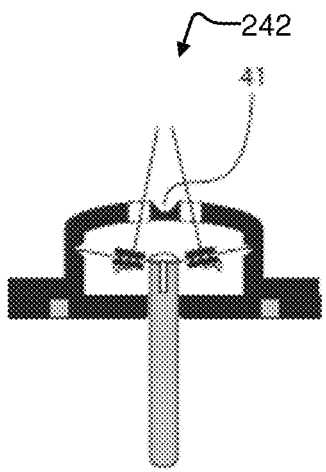
FIG. 7A  FIG. 7B
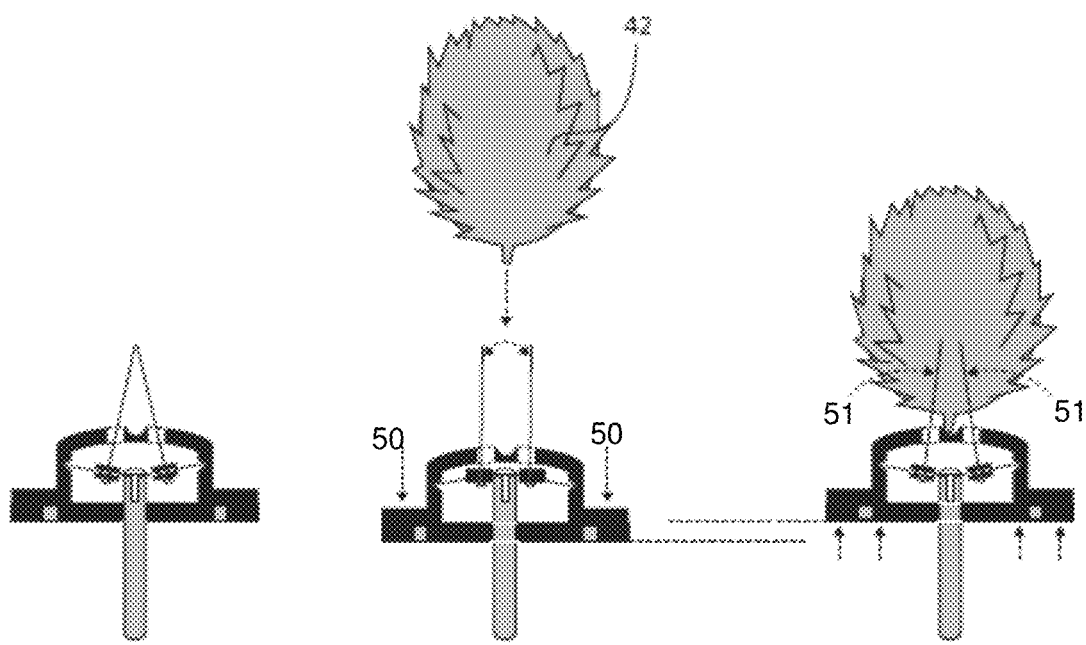
FIG. 7C  FIG. 7D  FIG. 7E

AUTOMATIC TRIMMING OF AGRICULTURAL PRODUCTS

CROSS-REFERENCE TO RELATED APPLICATIONS

This application is a non-provisional application that claims priority under 35 U.S.C. § 119(e) to U.S. Provisional Patent Application No. 63/344,525, filed on May 20, 2022, entitled "AUTOMATIC HARVEST, SORTING, PRUNING, AND TRIMMING OF AGRICULTURAL PRODUCTS," the entire contents of which are hereby incorporated by reference herein in their entireties.

TECHNICAL FIELD

Embodiments relate generally to the agricultural and mechanical arts, and more particularly but not exclusively, to methods, systems, apparatuses, and computer-readable media for automatic harvest, sorting, pruning, and trimming of agricultural products.

BACKGROUND

Artificial intelligence (AI) and machine learning (ML) techniques have been applied to many domains, including healthcare, medicine, finance, autonomous driving, and other domains. Within agriculture, AI has been developed for weed management, early detection of plant disease, and product detection & counting. However, the application of AI is still limited in some other domains of agriculture, and is particularly absent in harvest, sorting, pruning, and trimming of agricultural products.

For example, conventional technologies involving agricultural products are heavily reliant on human labor. Human laborers may traverse fields collecting agricultural products, sorting based on size & color, as well as employ physical pruning and trimming both in-the-field and in sorting operations/processes away from the field. While human labor is useful for the collection of many agricultural products, automation techniques have lagged. These and other drawbacks may be addressed by one or more technologies disclosed herein.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to some aspects, systems, apparatuses, methods, and non-transitory computer-readable media are provided.

In one aspect, an imaging assembly comprises an outer tube; an inner tube arranged within the outer tube and defining an air channel, wherein the air channel is configured to direct pressurized air from a first distal end of the outer tube to a second distal end of the outer tube; an image sensor arranged proximate the first distal end of the outer tube and configured to receive light from the second distal end of the outer tube, wherein the image sensor is further configured to capture images of an agricultural product arranged proximate the second distal end of the outer tube; an illumination source arranged proximate the image sensor and configured to illuminate in a direction of the second distal end of the outer tube; and an air source in fluid communication with the first distal end of the outer tube.

Various implementations of the imaging assembly are described.

In some implementations, the outer tube comprises an inner surface that is coated in black paint.

In some implementations, the inner tube comprises an inner surface that is reflective.

In some implementations, the imaging assembly further comprises an optical connector arranged on a first distal end of the inner tube, wherein the optical connector is operative to support the image sensor.

In some implementations, the optical connector comprises a plurality of baffles arranged about an axis collinear with a central axis of both the inner tube and the outer tube.

In some implementations, the image sensor is configured to process light in both visible and infrared wavelengths, and wherein the image sensor comprises an ultraviolet filter arranged thereon.

In some implementations, the illumination source is configured to illuminate with visible, infrared, and ultraviolet light, and wherein the ultraviolet filter is configured to block the ultraviolet light.

In some implementations, the illumination source comprises a plurality of individual light sources arranged about a central axis of the image sensor.

In some implementations, the imaging assembly further comprises a conveyor arranged proximate the second distal end of the outer tube, and wherein the conveyor comprises a conveyor chain having a plurality of chain links.

In some implementations, the imaging assembly further comprises a clamping member arranged on one chain link of the plurality of chain links, wherein the clamping member is configured to retain and rotate the agricultural product.

In some implementations, the imaging assembly further comprises a cutting assembly arranged proximate the conveyor, wherein the cutting assembly is configured to automatically remove plant material from the agricultural product.

In some implementations, the cutting assembly comprises a cutting disk, an oblique panel arranged in an oblique relationship to a central axis of the cutting disk, and an exhaust funnel arranged proximate the oblique panel, and wherein: the cutting disk is configured to spin on the central axis of the cutting disk and to remove the plant material; the oblique panel is configured to direct airflow from the air channel; and the exhaust funnel is configured to capture the plant material removed from the agricultural product.

In some implementations, the clamping member comprises: an upper housing; a lower housing affixed to the upper housing; an interior cavity defined by the upper housing and the lower housing; two or more pins arranged to protrude from the interior cavity and through an upper surface of the upper housing; and a leaf spring arranged within the interior cavity and against the two or more pins.

In some implementations, downward force applied to the clamping member causes a clamping force of the two or more pins to be released.

In some implementations, upward motion of the clamping assembly causes a clamping force of the two or more pins.

In some implementations, the imaging assembly further comprises a plurality of spacers arranged to support the inner tube within the outer tube.

In some implementations, the imaging assembly further comprises a light filter arranged in an image receiving path of the image sensor.

In some implementations, the imaging assembly further comprises an air outlet nozzle arranged on an interior surface of the outer tube proximate the second distal end of the outer tube.

In another aspect, a plant cutting apparatus comprises: a cutting assembly arranged to remove plant material from an agricultural product; a conveyor assembly arranged proximate the cutting assembly and configured to convey the agricultural product from an exterior of the cutting assembly into cutting relation with the cutting assembly; and an imaging assembly, wherein the imaging assembly comprises: an outer tube; an inner tube arranged within the outer tube and defining an air channel, wherein the air channel is configured to direct pressurized air from a first distal end of the outer tube to a second distal end of the outer tube; an image sensor arranged proximate the first distal end of the outer tube and configured to receive light from the second distal end of the outer tube, wherein the image sensor is further configured to capture images of the agricultural product; an illumination source arranged proximate the image sensor and configured to illuminate in a direction of the second distal end of the outer tube; and an air source in fluid communication with the first distal end of the outer tube.

In yet another aspect, a plant cutting apparatus comprises: a cutting assembly arranged to remove plant material from an agricultural product; a conveyor assembly arranged proximate the cutting assembly and configured to convey the agricultural product on a conveyor into cutting relation with the cutting assembly, wherein the cutting assembly comprises a clamping member arranged on the conveyor, wherein the clamping member comprises: an upper housing; a lower housing affixed to the upper housing; an interior cavity defined by the upper housing and the lower housing; two or more pins arranged to protrude from the interior cavity and through an upper surface of the upper housing; a leaf spring arranged within the interior cavity and against the two or more pins; and an imaging assembly, wherein the imaging assembly comprises: an outer tube; an inner tube arranged within the outer tube and defining an air channel, wherein the air channel is configured to direct pressurized air from a first distal end of the outer tube to a second distal end of the outer tube; an image sensor arranged proximate the first distal end of the outer tube and configured to receive light from the second distal end of the outer tube, wherein the image sensor is further configured to capture images of the agricultural product; an illumination source arranged proximate the image sensor and configured to illuminate in a direction of the second distal end of the outer tube; and an air source in fluid communication with the first distal end of the outer tube.

According to another aspect, portions, features, and implementation details of the systems, apparatuses, methods, and non-transitory computer-readable media disclosed herein may be combined to form additional aspects, including some aspects which omit and/or modify some or portions of individual components or features, include additional components or features, and/or other modifications; and all such modifications are within the scope of this disclosure.

BRIEF DESCRIPTION OF THE DRAWINGS

FIG. 7A is an exploded view of a clamping member of the cutting assembly of FIG. 6A, in accordance with some implementations.

FIG. 7B is a side view of the clamping member of FIG. 7A, in accordance with some implementations.

FIG. 7C is a side view of an unloaded clamping member, in accordance with some implementations.

FIG. 7D is a side view of a loading sequence of a clamping member, in accordance with some implementations.

FIG. 7E is a side view of a loaded clamping member, in accordance with some implementations.

DETAILED DESCRIPTION

Figure 1:
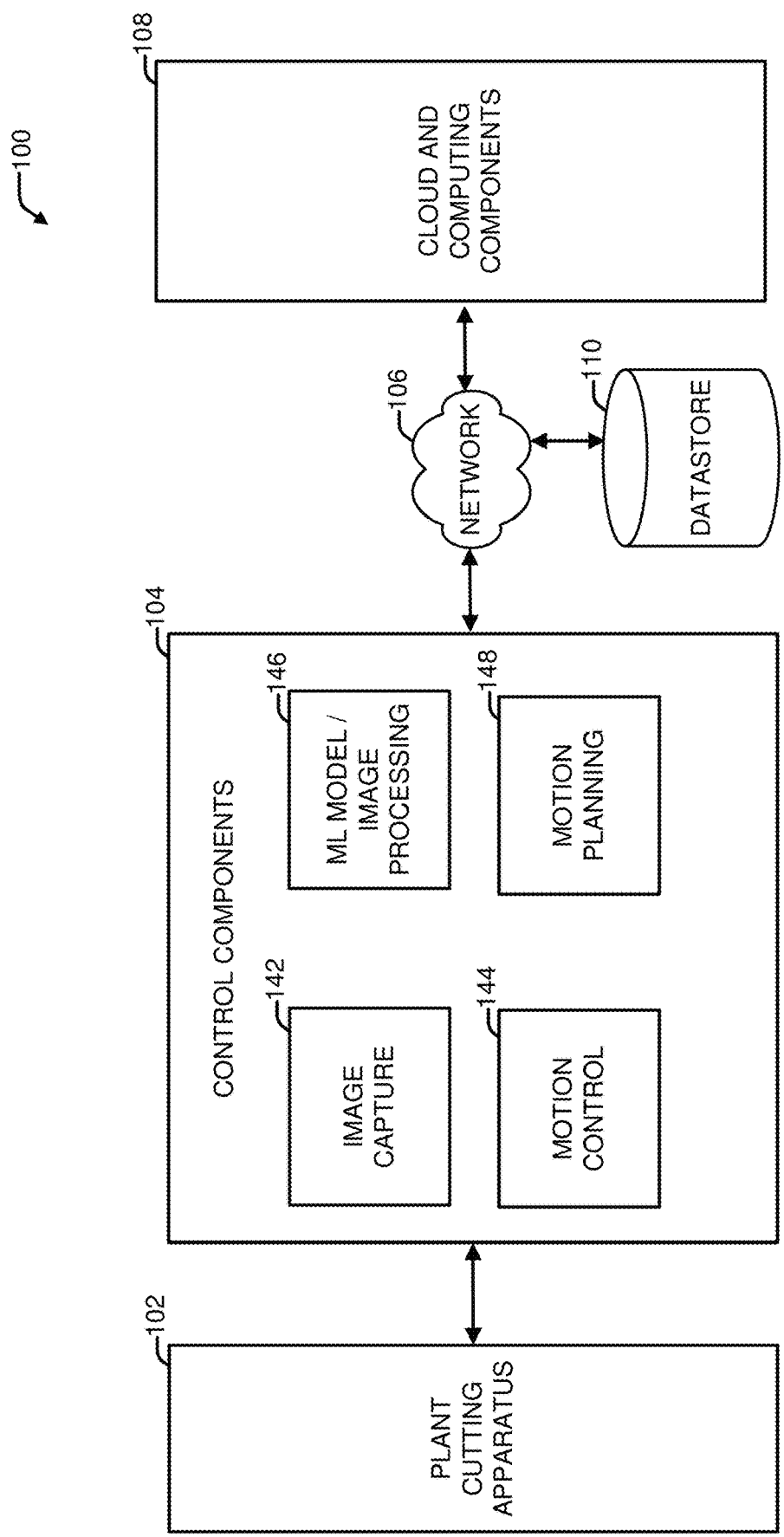
FIG. 1 is a diagram of an example system architecture for computer-assisted and automatic harvest, sorting, pruning, and trimming of agricultural products, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

Systems and apparatuses described herein may be related to robotics, automation, and agricultural technology. Systems and apparatuses may leverage artificial intelligence and robotics and apply the same to processing of agricultural products. Although described in various forms herein as related specifically to cannabis, it should be understood that the same may be varied to virtually any agricultural product. Accordingly, it is understood that while the below description, examples, and aspects are described with reference to particular features of cannabis plants and flowers, the same may be varied in many ways so as to apply to different agricultural products that undergo a manual or semi-automated trimming and/or pruning process.

Cannabis is a moderately hardy plant that can be farmed and harvested in a plurality of agricultural zones. Historically used for fiber, pulp, paper, personal-use, personal consumption, medicinal-use, and other suitable uses, cannabis in general is a relatively productive agricultural product. The 2018 Farm Bill nationally legalized the production of U.S. hemp (i.e., cannabis) in the United States of America. This was largely driven by the clinically proven benefits of cannabidiol (CBD), tetrahydrocannabinol (THC), lipids, and cannabinoids produced on patients suffering from epilepsy and neurological disorders. Since then, the market has exploded with hemp-derived products lining retail shelves and online stores.

However, cannabis processing is a particularly problematic space with regard to automation due to the natural features of the cannabis plant being difficult to translate into automation. For example, cannabis plants include at least two main features: stalk and flower. Cannabis stalk (sometimes referred to as stems or bodies), can be processed into fiber, pulp, and many different downstream products using various material derived from the stem or stalk. Processing of cannabis stalk can include removal of plant material such as leaves and flowers, and pre- and post-processing of stalks to extract useful material. Refuse from cannabis stalk processing can also be used in animal feed, concrete aggregate, paper products, and other uses.

Cannabis flowers (sometimes referred to as buds) are generally used in personal consumption, for example, for smoking, vaporization, extraction (e.g., CBD or THC condensate, distillate, oil, hashish, etc.), topical ointment, and so forth. It should be understood that these examples are non-exhaustive, as new forms of cannabis products for personal consumption are created regularly.

Cannabis flowers generally include features such as seeds, pistils, fan leaves, sugar leaves, trichomes, and/or bract structures arranged on a cola of varying sizes depending upon a particular type of cannabis. Cannabis trichomes are particularly interesting structures due to a natural "stickiness" associated therewith. For example, trichomes are small hairs or outgrowths from the epidermis of the cannabis plant and are typically unicellular or glandular. Trichomes develop when the cannabis plant transitions from a vegetative stage to a flowering stage. Trichomes may be arranged within and about cannabis colas and are particularly desirable structures to retain on final products for personal consumption. For example, some end-users regularly view an absence of trichomes on a cola as an inferior product.

Traditionally, colas may be removed from cannabis stalks for personal consumption processing. Upon removal, the colas may be processed with manual trimming tools to remove fan leaves and excess stem material, with an aim to retain trichome material and/or sugar leave material for enhanced or improved amounts of CBD, THC, and other cannabinoids on the processed buds. However, these manual tools often damage a look, aesthetic, and structure of underlying bud structures and end-products. Furthermore, these tools eventually become clogged with the sticky trichomes which cover the cola and/or buds.

For example, for each pass of a manual trimming tool (such as a pair of scissors), external edges and surfaces of the trimming tools generally contact a large number of trichome structures and retain them during subsequent passes. This causes a snowballing fouling effect whereby more and more plant material become lodged on the tools and fouls the tools. Furthermore, human hands implementing the trimming process further disturb plant structures and increase loss of desirable plant structures.

However, the architecture and platform disclosed herein limits damage from the trimming process and employ techniques so as to minimize fouling of elements with trichomes, and wasting of trichomes, which are otherwise a desirable feature of cannabis to remain on end-products.

For example, a plant cutting assembly as described herein may include a spinning cutting wheel or disk (or multiple cutting wheels or disks). The cutting wheel may contact edges or outer silhouettes of cannabis flowers thereby limiting interaction with trichome material of the flowers. Furthermore, the cutting wheel may be automatically and programmatically directed to trim in a manner which limits contact with desirable structures of the cannabis flower. This results in a technical benefit of reduced fouling, increased weight of processed cannabis flowers, and a higher percentage of desirable cannabis compounds in an end product.

The plant cutting assembly may also include positive pressure componentry arranged to further reduce fouling by removing excess plant material. The plant material removal may limit refuse material becoming lodged or otherwise fouling the cutting wheel, underlying automation and motion components, and mechanical components. In this manner, the plant cutting assembly results in the technical benefit of reduced fouling, decreased cycle time, and decreased down-time or maintenance for cleaning cutting components.

Additionally, an imaging assembly as described herein may include additional positive pressure componentry arranged to reduce fouling of automated image capture components. In this manner, the imaging assembly results in the technical benefit of reduced fouling, decreased cycle time, and decreased down-time or maintenance of image capture components.

Furthermore, a conveyor assembly arranged to move unprocessed cannabis flowers into cutting orientation within the plant cutting assembly may include clamping members arranged to support and transport cannabis flowers. The clamping members may include protruding engagement members arranged to support a cannabis flower with reduced disturbance of exterior plant features such as trichomes. In this manner, the clamping members may prevent removal of desirable material through internal clamping as compared to external clamping. This results in technical benefits including increased weight of processed cannabis flowers, higher percentages of desirable cannabis compounds in end products, as well as improved efficiency in loading/unloading cannabis flowers into the plant cutting assembly.

These and other features, improvements, and benefits are apparent in the below detailed description, where a plurality of aspects of this disclosure are described in detail.

Hereinafter, an example architecture for implementing computer-assisted and automatic pruning, trimming, processing, and other functions related to agricultural products such as those presented above, is described with reference to FIG. 1.

FIG. 1 illustrates architecture 100, in accordance with some implementations of the disclosure. FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

The architecture 100 (also referred to as a "system" herein) includes an agricultural product or plant cutting apparatus 102, control components 104, cloud and computing components 108, data store 110, all connected via a network 106. Various sub-components may be associated with each of the plant cutting apparatus 102, control components 104, cloud and computing components 108, and data store 110.

Architecture 100 is provided for illustration. In some implementations, the Architecture 100 may include the same, fewer, more, modified, or different elements configured in the same or different/modified manner as that shown in FIG. 1.

In some implementations, network 106 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In some implementations, data store 110 may be a tangible non-transitory computer readable memory (e.g., random access memory), a cache, a drive (e.g., a hard drive), a flash drive, a database system, or another type of component or device capable of storing data. The data store may also include multiple storage components (e.g., multiple drives or multiple databases) that may also span multiple computing devices (e.g., multiple server computers).

In some implementations, the control components 104 can include a server having one or more computing devices (e.g., a cloud computing system, a rackmount server, a server computer, cluster of physical servers, virtual server, etc.). In some implementations, a server may be included in the cloud and computing components illustrated, be an independent system, or be part of another system or platform.

In some implementations, the control components 104 may include an image capture module 142, a motion control module 144, a machine learning (ML) model and/or image processing module 146, and/or a motion planning module 148. The image capture module 142 may be configured to capture image data received from an image capture device, such as a digital camera or other suitable capture device of the plant cutting apparatus 102. The motion control module 144 may be configured to control the plant cutting apparatus 102 and/or one or more sub-components associated therewith. The ML model and/or image processing module 146 may determine one or more cutting masks or silhouettes. The motion planning module 148 may determine one or more cutting paths based on the cutting masks or silhouettes.

In some implementations, the cloud and computing components 108 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations with the architecture 100 and to provide a user with access to the architecture 100. The architecture 100 may also include a website (e.g., one or more webpages) or application back-end software that may be used to provide a user with access to content provided by architecture 100. For example, users may access architecture 100 through a computing device, over a network, and/or as software-as-a-service (SaaS). Other variations may also be applicable.

In some implementations, architecture 100 may include a type of online agricultural platform and/or a virtual agricultural platform. For example, the architecture 100 may provide visualization of real agricultural products in a virtual manner.

In some implementations, architecture 100 may include a type of on-site agricultural platform and/or control architecture. For example, the architecture 100 may be deployed on or near a jobsite, agricultural harvest area, or other suitable area. The architecture may be utilized on-site for performing functions related to harvest, pruning, trimming, sorting, and other suitable functions.

In some implementations, the architecture 100 can create and host one or more training datasets for utilization by machine learning algorithms. The one or more training datasets may include labeled training images or other training data. The one or more training datasets may be used in supervised and/or unsupervised learning techniques for various machine learning models and artificial intelligence algorithms related to agricultural products.

It may be noted that the architecture 100 and hosting of training datasets, is provided for purposes of illustration, rather than limitation. In some implementations, architecture 100 may host one or more media items that can include communication messages from one user to one or more other users. Media items can include, but are not limited to, digital video, digital images, digital photos, prior use data, user interfaces, training interfaces, software applications, etc. In some implementations, one or more hosted items may be an electronic file that can be executed or loaded using software, firmware or hardware configured to present the hosted item to an entity or user.

In some implementations, the cloud and computing components 108 may each include computing devices such as personal computers (PCs), mobile devices (e.g., laptops, mobile phones, smart phones, tablet computers, or netbook computers), network-connected televisions, gaming consoles, etc. In some implementations, a client device may also be referred to as a "user device." In some implementations, one or more client devices may connect to the architecture 100 at any given moment. It may be noted that any number of client devices are described herein and provided as illustration, rather than limitation. In some implementations, any number of client devices may be used.

In some implementations, each client device may include an instance of methods and/or user interfaces. In one implementation, the user interfaces may permit users to use and interact with architecture 100, such as for training machine learning models, training artificial intelligence algorithms, selectively pruning agricultural products, selectively trimming agricultural products, selectively processing agricultural products, and so forth. In one example, the user interface may be a web application (e.g., an application that operates in conjunction with a web browser) that can access, retrieve, present, or navigate content (e.g., to capture images, develop training datasets, etc.) served by a web server. In another example, the user interface may be a native application (e.g., a mobile application, app, or a software application) that is installed and executes local to a client device and allows users to interact with architecture 100. The user interface may render, display, or present the content (e.g., a web page, a graphical user interface, a media viewer, a training viewer, etc.) to a user.

In general, functions described as being performed by the architecture 100 can also be performed by remote or separate client device(s), or a server, in other implementations if appropriate. In addition, the functionality attributed to a particular component can be performed by different or multiple components operating together. The architecture 100 can also be accessed as a service provided to other systems or devices through appropriate application programming interfaces (APIs), and thus is not limited to use in websites or as standalone software applications.

In general, agricultural products such as cannabis flowers may be placed in the plant cutting apparatus 102. The agricultural products may be supported by clamping members arranged on a conveyor. Image capture module 142 and motion control module 144 may direct the plant cutting apparatus 102 to move, rotate, and/or adjust placement of the agricultural products for processing and trimming.

For example, the image capture module 142 may capture images. The image capture module 142 may include functionality for exposure estimation, flatfield sensor correction, and lens rectification.

For example, motion control module 144 may direct control elements for adjustment of the agricultural product. The motion control module 144 may include functionality for conveyor/rotation motion and other motion, profile calculation, 3D image constructions, and/or motor control For example, ML model and/or image processing module 146 may leverage a machine learning model or artificial intelligence algorithm for processing images and determining cut-profiles, 3D models, and/or silhouettes for the plant cutting apparatus 102. The ML model and/or image processing module 146 may include functionality for physics simulation, machine learning models (e.g., convolutional neural networks (CNN), and other suitable models), and communication between different machine learning models.

For example, motion planning module 148 may plan and determine motion for one or more agricultural products. The motion planning module may include functionality for cut-point depth calculations/determinations, online 3D modeling and analysis of agricultural products, and cut sequence planning.

Cloud and computing components 108 may include an image database or data store configured to store and provide human-labeled images, automatically labeled images, and other training and functional images. The cloud and computing components 108 may also include an automatic labeler component configured to automatically generate labeled images for training machine learning models. The cloud and computing components 108 may also include functionality for data management, machine learning model training, machine learning model refinement, machine learning model tuning, and other functionality.

While some components are labeled with cannabis-specific terminology, it should be readily understood that any agricultural product may be processed with the features presented with reference to FIG. 1 and architecture 100.

Hereinafter, various sub-components of the plant cutting apparatus 102 are described in more detail.

Plant Cutting Apparatus

Figure 2:
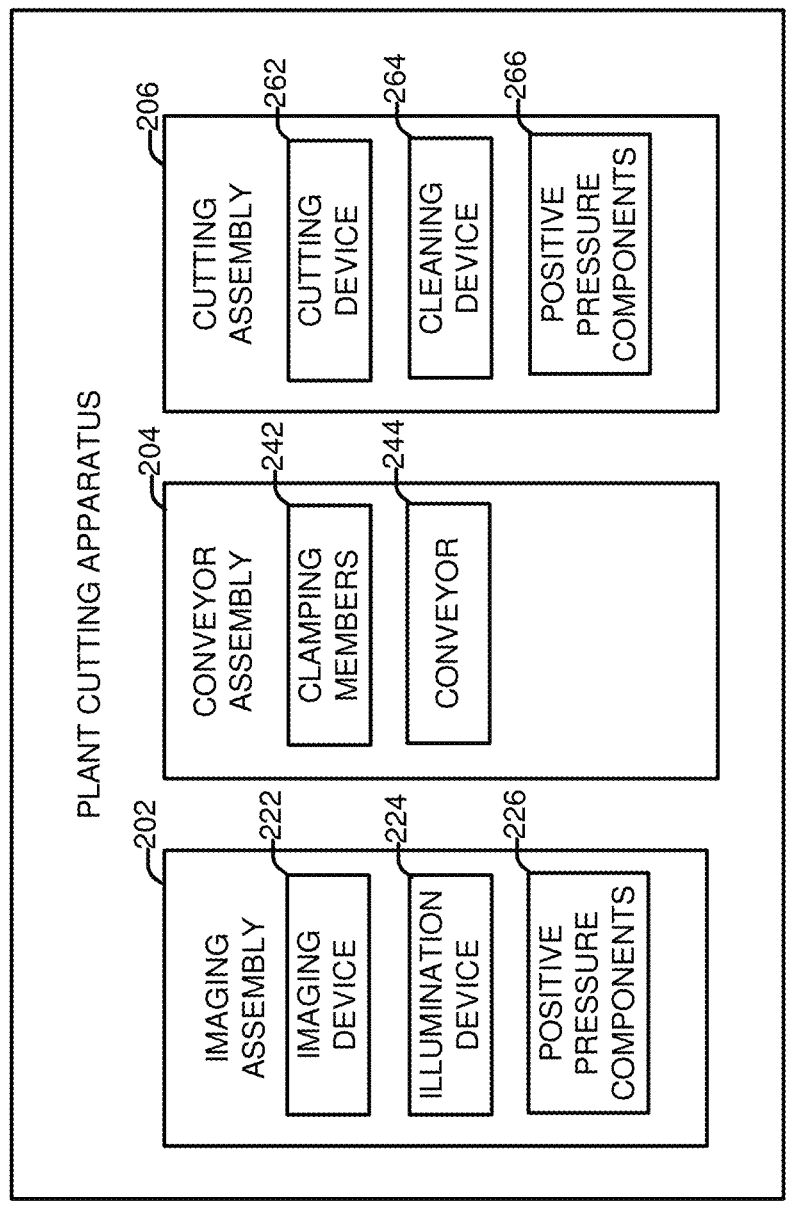
FIG. 2 is a diagram of an example automatic plant cutting apparatus, in accordance with some implementations.

FIG. 2 is a diagram of an example automatic plant cutting apparatus 102, in accordance with some implementations. The plant cutting apparatus 102 may be deployed in conjunction with a system architecture such as system 100, in some implementations. The plant cutting apparatus 102 may include an imaging assembly 202, a conveyor assembly 204, and a cutting assembly 206.

The imaging assembly 202 may be arranged to capture images of an agricultural product before, during, and after a trimming operation. The imaging assembly 202 may include an imaging device 222, an illumination device 224, and positive pressure components 226.

The imaging device 222 may include a digital camera, in some implementations. The imaging device 222 may include at least one image sensor, in some implementations. The imaging device 222 may include an image sensor operable to receive and sense light in an ultraviolet range and/or an infrared range, in addition to visible light, in some implementations. Accordingly, the imaging device 222 may be operable to process images in both infrared light and visible light. It is noted that cannabis trichomes may be excited by ultraviolet light and produce and/or fluoresce visible light responsive thereto. The imaging device may therefore receive visible light emanating from cannabis structures illuminated by ultraviolet light, even while having an ultraviolet filter arranged upon an imaging sensor.

The illumination device 224 may include one or more illumination sources, in some implementations. The illumination device 224 may include one or more light-emitting diodes (LED) in some implementations. The illumination device 224 may include a combination of LED and alternative light sources, in some implementations.

Furthermore, relatively strong ultraviolet light may be used to further process agricultural products, in some implementations. For example, an ultraviolet light source may be included in the illumination device 224 such that ultraviolet light of a power or intensity suitable to kill contaminants may be used to sanitize contaminants of the agricultural product. For example, mold, spores, bacteria, viruses, and other contaminants may be rendered inert through illumination with ultraviolet light for a predetermined or established amount of time. In these and other implementations, the imaging device 222 may include an ultraviolet filter arranged to filter ultraviolet light and to avoid damage to optical and imaging sensors of the imaging device 222.

The positive pressure components 226 may include an airway, diaphragm, pressurized air source, and other components. The positive pressure components 226 may include an air channel or pathway in some implementations. The positive pressure components 226 may include a diaphragm in some implementations. The positive pressure components 226 may include an air filter in some implementations. The positive pressure components 226 may include a negative pressure or airflow sink in some implementations. The positive pressure components 226 may include a vacuum component in some implementations.

In operation, conveyor assembly 204 may transport an agricultural product from a loading area to the cutting assembly 206. The imaging assembly 202 may be in an orientation allowing image capture of the agricultural product within the cutting assembly 206. The conveyor assembly 204 may include clamping members 242 arranged on a conveyor 244.

The clamping members 242 may be removeable clamping members in some implementations. The clamping members 242 may be arranged to apply an internal clamping force upon the agricultural product in some implementations. The clamping members 242 may be arranged to apply a clamping force that is orthogonal to a mounting axis of the clamping members 242 from within the agricultural product in some implementations. The clamping members 242 may include a spring or elastomeric member in some implementations. The clamping members 242 may be operative to receive an agricultural product, clamp the agricultural product, transport the agricultural product on the conveyor 244, and to release the agricultural product after a trimming operation, in some implementations.

The conveyor 244 may include a chain link conveyor in some implementations. The chain link conveyor may include individual mounting locations for a clamping member 242 to engage therewith in some implementations. The conveyor 244 may be operative to transport clamping members 242 (with or without agricultural products) to the cutting assembly 206 and within imaging view of the imaging assembly 202 in some implementations.

The cutting assembly 206 may include a cutting device 262, a cleaning device 264, and positive pressure components 266. The cutting assembly 206 may be arranged to trim an agricultural product mounted on a clamping member 242, in some implementations. The cutting assembly 206 may be arranged to cut away portions of an agricultural product mounted on a clamping member 242, in some implementations.

The cutting device 262 may include a spinning cutting disk or wheel in some implementations. The cutting device 262 may include one pinning cutting disk or wheel in some implementations. The cutting device 262 may include two or more spinning cutting disks or wheels in some implementations. The spinning cutting disk or wheel may include a plurality of cutting edges or teeth arranged on a periphery of the disk. The spinning cutting disk or wheel may include a smooth cutting edge in some implementations. The spinning cutting disk or wheel may include a jagged or toothed cutting edge in some implementations. The spinning cutting disk or wheel may be rotated by an electrical or pneumatic motor in some implementations. The spinning cutting disk or wheel may include ultrasonic drivers in some implementations.

In some implementations, the cutting device 262 may include a laser cutting device. In some implementations, the cutting device 262 may include a mechanical cutting devices such as actuated shears, knives, keratomes, or other cutting devices.

The cleaning device 264 may include a tool bath configured to remove fouling from the cutting device 262 in some implementations. The cleaning device 264 may include a tool bath configured to be continuously replenished and/or cycled in some implementations. The cleaning device 264 may be configured to operate while filled with a solvent or cleaning fluid in some implementations.

The positive pressure components 266 may include an airway, diaphragm, pressurized air source, and other components. The positive pressure components 266 may include an air channel or pathway in some implementations. The positive pressure components 266 may include a diaphragm in some implementations. The positive pressure components 266 may include an air filter in some implementations. The positive pressure components 266 may include a negative pressure or airflow sink in some implementations. The positive pressure components 266 may include a vacuum component in some implementations.

In operation, the conveyor assembly 204 is configured to move loaded clamping members into imaging relation and cutting relation with the imaging assembly 202 and cutting assembly 206, respectively. Operation of the conveyor assembly 204, the imaging assembly 202, and the cutting assembly 206 may be directed by any suitable component of the system 100. Operation of the conveyor assembly 204, the imaging assembly 202, and the cutting assembly 206 may be based upon cutting paths determined by a machine learning model, in some implementations.

The plant cutting apparatus 102 may include more or fewer components than those illustrated in FIG. 2. Furthermore, individual components of the plant cutting apparatus 102 may be arranged in a different relation or order than illustrated in FIG. 2 without departing from the scope of this disclosure. Hereinafter, individual components and operation of the imaging assembly 202 are described in detail.

Imaging Assembly

Figure 3A:
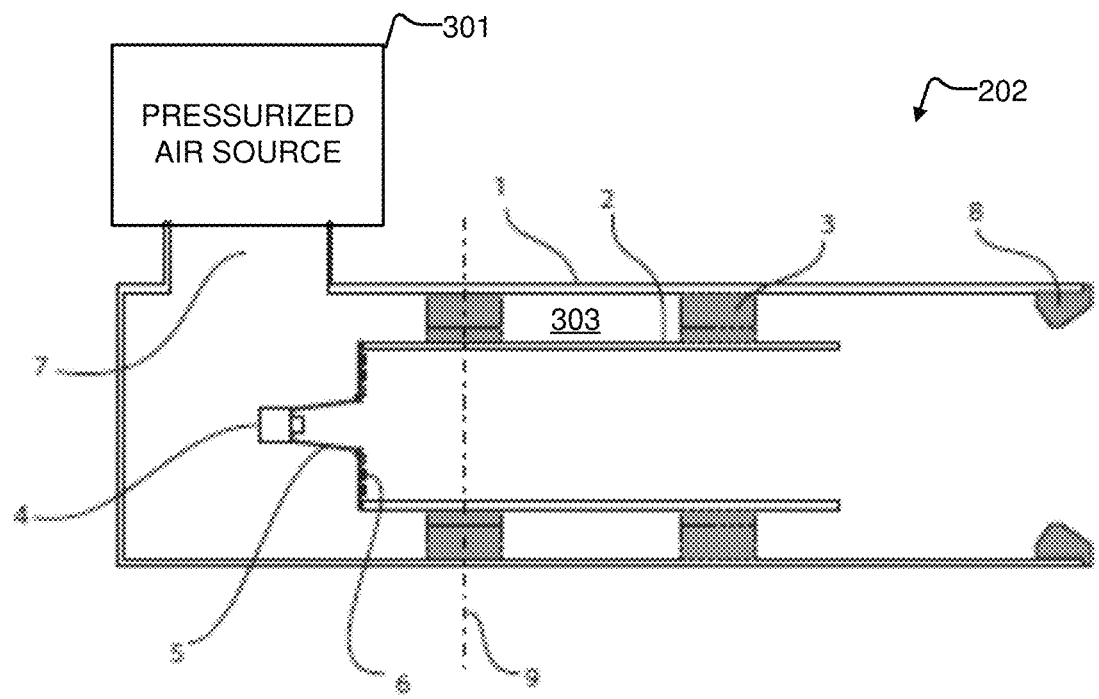
FIG. 3A is a plane view of a positive pressure imaging assembly, in accordance with some implementations.

FIG. 3A is a plane view of a positive pressure imaging assembly, such as imaging assembly 202, in accordance with some implementations.

The imaging assembly 202 may be arranged to receive positive air pressure at a first distal end, and direct airflow through to a second distal end. As illustrated, the imaging assembly 202 includes an outer tube 1 and an inner tube 2. In some implementations, airflow is directed over the inner tube 2 and through the outer tube 1. In some implementations, the outer tube 1 maybe omitted and instead positive airflow may be directed over the inner tube 2 from one or more positive airflow sources.

Generally, the outer tube 1 may be internally coated with a relatively dark pigmented paint or coating, such as black paint. The outer tube 1 may be formed of metal, wood, plastic, or any suitable material. The inner tube 2 may have an at least partially reflective surface that may be coated or uncoated with paint. The inner tube 2 may be formed of metal, wood, plastic, or any suitable material.

The imaging assembly 202 further includes spacers 3 configured to support, retain, and/or space the inner tube 2 within the outer tube 1. The spacers 3 may be formed of metal, plastic, wood, or any suitable material. In implementations where the outer tube 1 is omitted, the spacers 3 may be arranged to support the inner tube 2 within an alternative structure (e.g., such as a housing or frame) of the imaging assembly 202.

The imaging assembly 202 may further include an image sensor 4 arranged proximate the inner tube 2 and/or within an optical connector 5. The image sensor 4 may include any suitable image sensor as described above. The optical connector 5 may be formed of the same or different materials than the outer tube 1 and inner tube 2. In some implementations, the optical connector 5 may be a frustoconical member attached to a first distal end of the inner tube 2. In some implementations, the optical connector 5 is a single piece of material. In some implementations, the optical connector 5 is formed of multiple pieces of material.

The imaging assembly 202 may further include illumination source 6 arranged about the image sensor 4. The illumination source 6 may include a plurality of light sources mounted on a printed circuit board, in some implementations. The illumination source 6 may include a plurality of light sources mounted onto the optical connector 5, in some implementations. The illumination source 6 may include any suitable illumination sources as described above.

The imaging assembly 202 may further include an air inlet 7. The air inlet 7 may be an orifice formed through a surface of the outer tube 1, in some implementations. The air inlet 7 may be configured to receive pressurized air from a pressurized air source 301. The air inlet 7 may be in fluid communication with the pressurized air source 301, in some implementations. The air inlet 7 may direct air flow from the pressurized air source 301 and into the outer tube 1. Channels 303 defined between the inner tube 2 and outer tube 1 may direct the received air past the image sensor 4 and optical connector 5, and towards a second distal end of the outer tube 1.

The imaging assembly 202 may further include air outlet nozzles 8 arranged on the second distal end of the outer tube 1. The air outlet nozzles 8 may be formed of metal, plastic, wood, or another suitable material. The air outlet nozzles 8 may be configured to disrupt laminar air flow and to promote turbulent airflow directed towards an agricultural product.

Figure 3B:
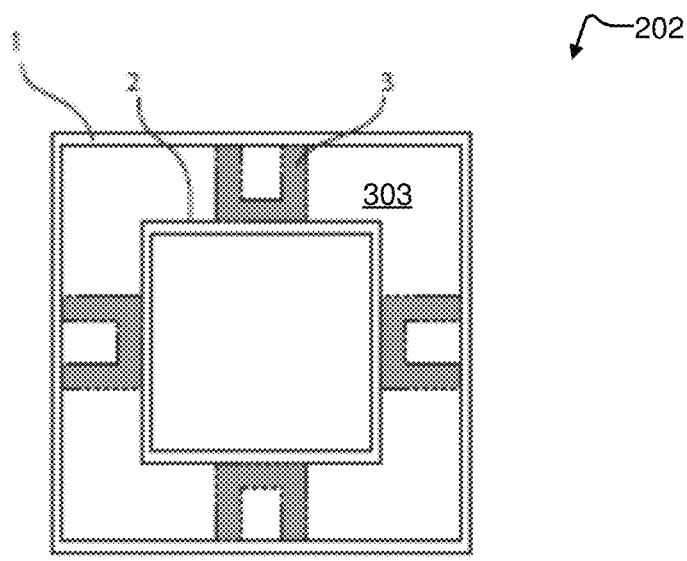
FIG. 3B is a cross section view of the positive pressure imaging assembly of FIG. 3A, in accordance with some implementations.

FIG. 3B is a cross section view taken on plane 9 of the positive pressure imaging assembly 202, in accordance with some implementations. As shown in FIG. 3B, spacers 3 may be formed as U-channels in some implementations. As further shown, the inner tube 2 is arranged to be relatively centered or collinear with a central major axis of the outer tube 1. In some implementations, the arrangement and alignment of the inner tube 2 and outer tube 1 may be different.

Turning now to the views of FIG. 4, the image sensor 4 and optical channel 5 are described in further detail.

Figure 4A:
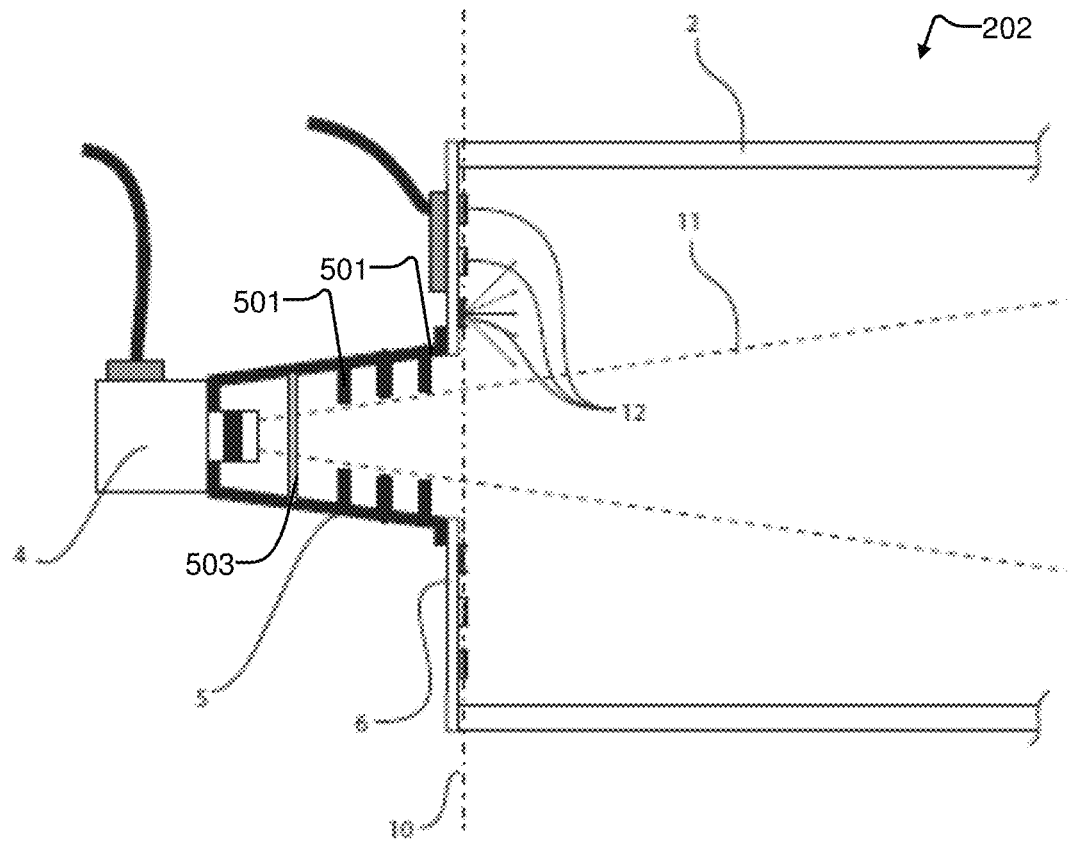
FIG. 4A is a detail view of imaging components arranged in the positive pressure assembly of FIG. 3A, in accordance with some implementations.

FIG. 4A is a detail view of imaging components arranged in the positive pressure assembly 202, in accordance with some implementations. As shown, the optical connector 5 may include a plurality of baffles 501 arranged about a central axis of the image sensor 4. Furthermore, a light filter 503 may be arranged to filter light incident upon the image sensor 4, in some implementations.

During operation, an angular field of view 11 is incident upon image sensor 4 and allows image capture of an agricultural product arranged near the second distal end of the outer tube 1. Light produced by individual light sources 12 are reflected by the agricultural product and towards the image sensor 4.

Figure 4B:
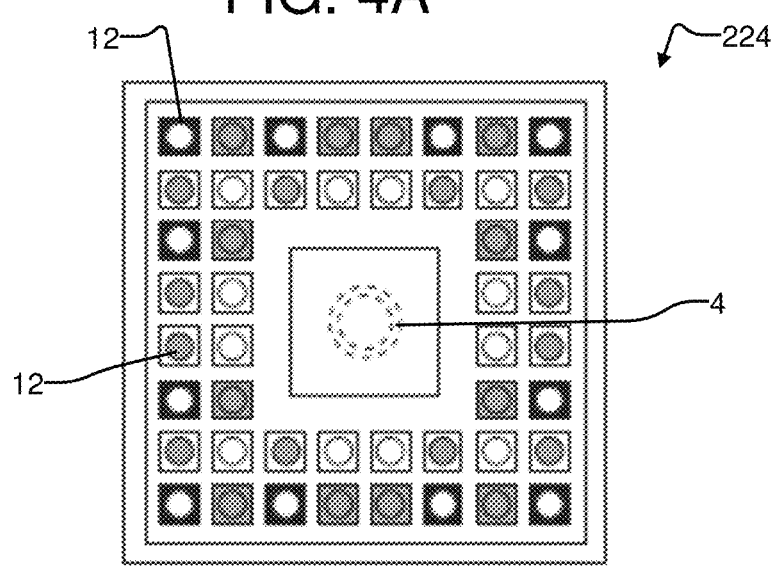
FIG. 4B is a cross section view of illumination components of the imaging components of FIG. 4A, in accordance with some implementations.

FIG. 4B is a cross section view of illumination components and light sources 12 of the imaging components of FIG. 4A, in accordance with some implementations. As shown, the individual sources 12 are arranged about a periphery of the image sensor 4.

Turning now to the views of FIG. 5, the image sensor 4 and associated light paths are described in further detail.

Figure 5A:
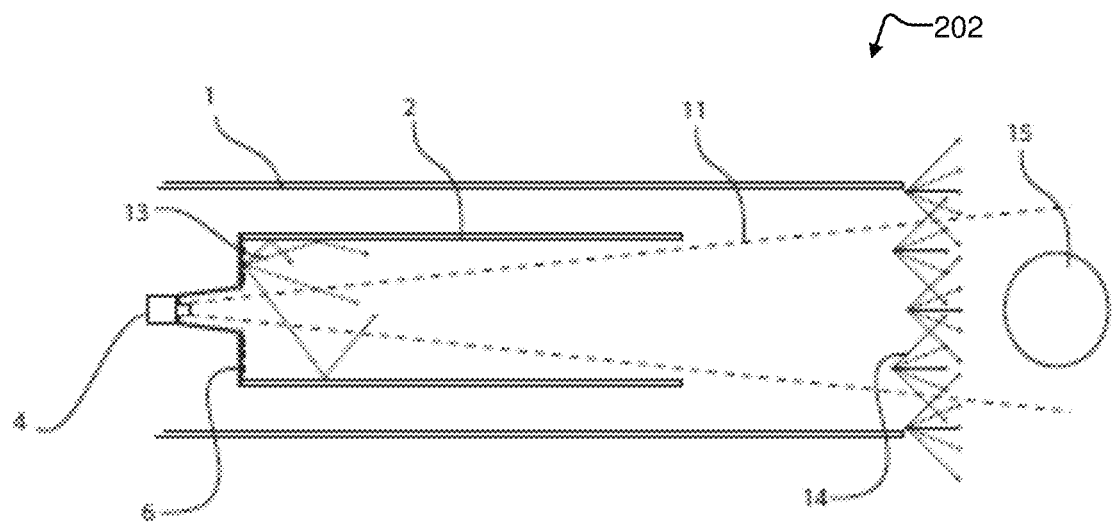
FIG. 5A is an alternative plane view of the positive pressure imaging assembly of FIG. 3A, in accordance with some implementations.
Figure 5B:
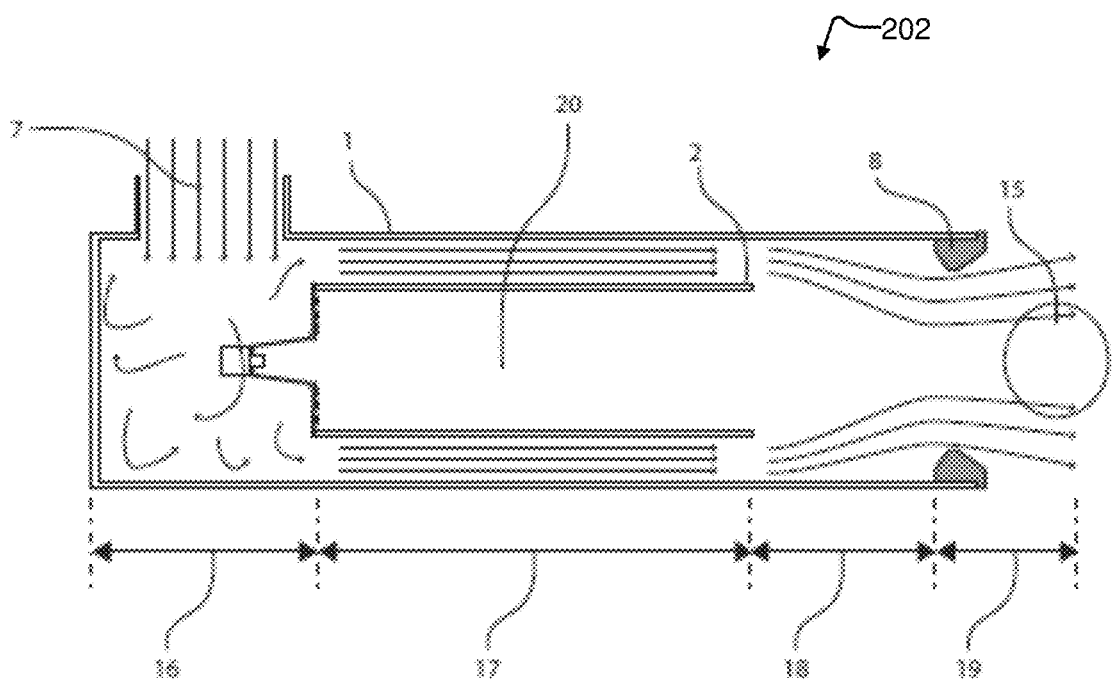
FIG. 5B is an additional alternative plane view of the positive pressure imaging assembly of FIG. 3A, in accordance with some implementations.

FIG. 5A is an alternative plane view of the positive pressure imaging assembly 202, and FIG. 5B is an additional alternative plane view of the positive pressure imaging assembly 202, in accordance with some implementations. As illustrated, light 13 emitted from individual light sources 12 reflects from an inner surface of the inner tube 2 and towards an agricultural product 15. Scattered homogenous light 14 may be incident upon the agricultural product 15 and reflected back toward the image sensor 4. Furthermore, as explained briefly above, pressurized air may be promoted to flow towards the agricultural product 15.

For example, as shown in FIG. 5B, region 16 of the imaging assembly 102 includes turbulent air received at inlet nozzle 7. The region 16 includes turbulent air that may also be operative to cool the image sensor 4.

Region 17 of the imaging assembly 202 may include relatively laminar airflow within channel 303 that is directed towards the second distal end of the outer tube 1. Upon this laminal flow reaching region 18, airflow partially converges as it piles up against the one or more nozzles 8. Thereafter, region 19 includes air that acts similar to an "air knife" upon edges of the agricultural product 15. The region 19 of airflow also reduces intrusion of refuse material cut away from the agricultural product 15. In this manner, the positive pressure of the imaging assembly 202 reduces fouling of the image sensor 4, the optical channel 5, the illumination sources 12, and other components of the imaging assembly 202.

Furthermore, the positive pressure and airflow limit intrusion of material and refuse from entering area 20 defined by the inner tube 2, such that improved image capture by image sensor 4 is made possible. Accordingly, airflow through regions 16, 17, and 18 provide an air knife in region 19, which both improves image capture and reduces particulate matter deposition within the imaging assembly 202.

Hereinafter, details surrounding both the conveyance of the agricultural product 15 and cutting of portions of the agricultural product 15 are described with reference to the views of FIG. 6.

Cutting Assembly and Conveyor Assembly

Figure 6A:
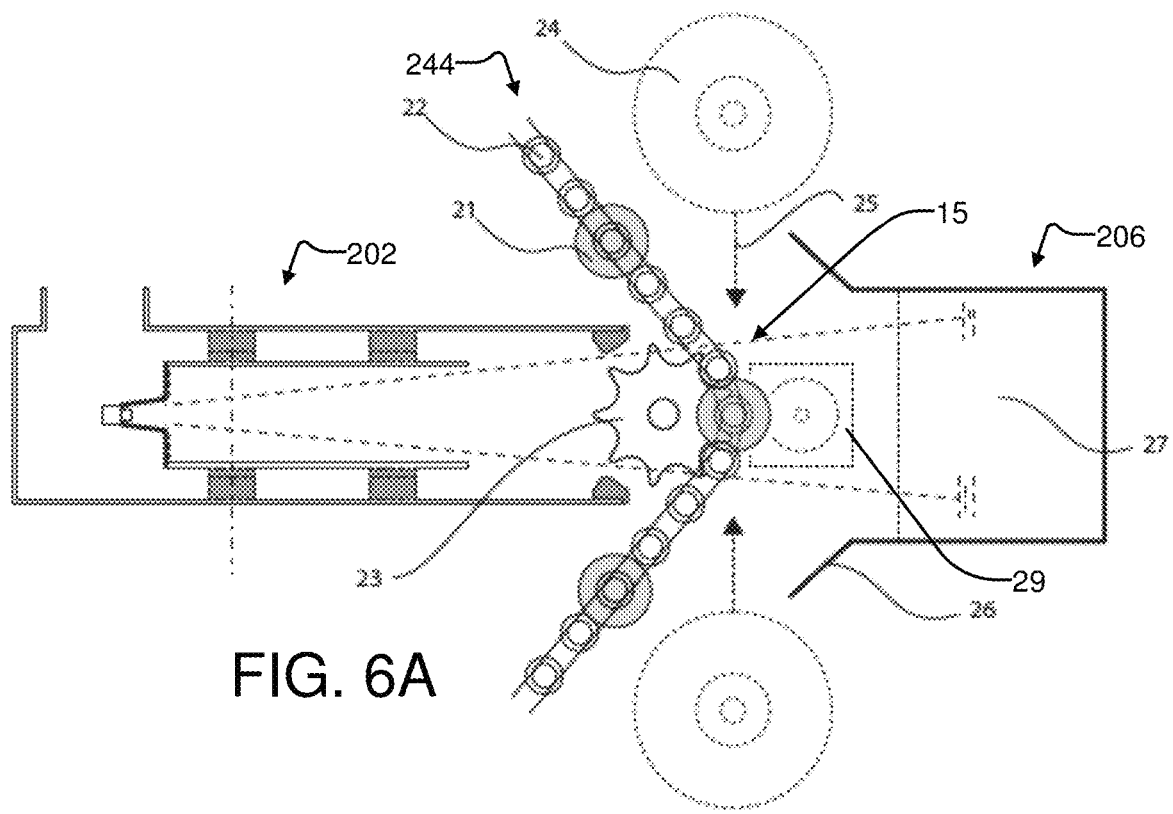
FIG. 6A is a plane view of a cutting assembly, in accordance with some implementations.
Figure 6B:
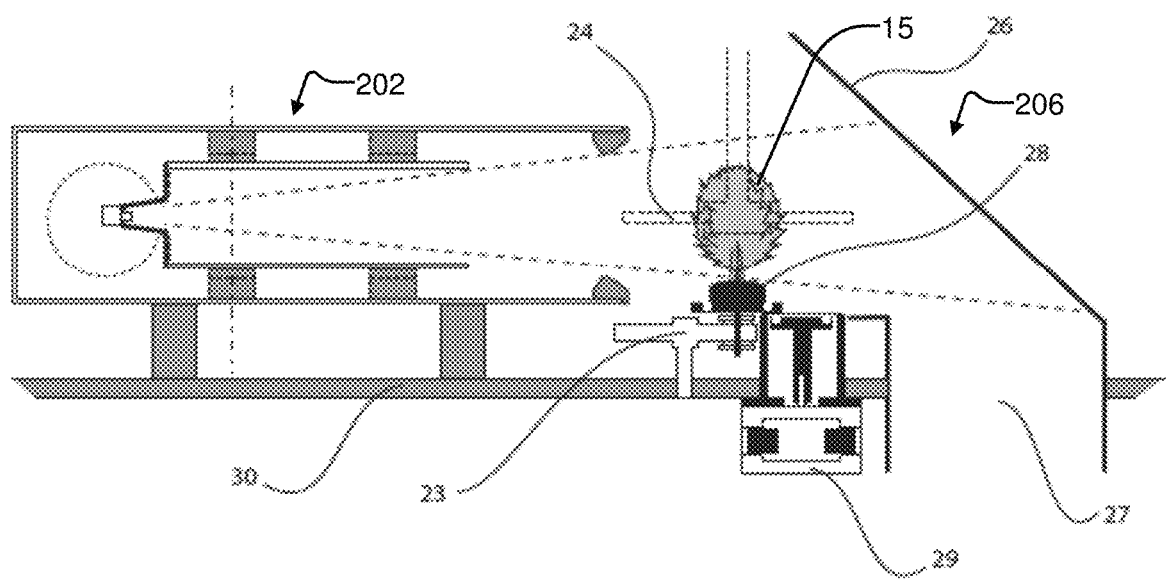
FIG. 6B is a side view of the cutting assembly of FIG. 6B, in accordance with some implementations.

FIG. 6A is a plane view of cutting assembly 206 and conveyor assembly 204, and FIG. 6B is a side view of the cutting assembly 206 and conveyor assembly 204, in accordance with some implementations. As shown, cutting assembly 206 may be arranged proximate to the imaging assembly 202 such that placement of an agricultural product 15 by conveyor 244 allows both imaging and cutting/trimming of an agricultural product.

The conveyor 244 may be arranged to convey agricultural products from an exterior area of the cutting assembly 206 and into cutting arrangement with the cutting assembly 206. For example, the conveyor 244 may include a conveyor chain 22 arranged to convey one or more individual clamping members 21.

As additionally shown, the cutting assembly 206 may include its own positive pressure system comprising, at least, oblique panel 26 configured to direct air into exhaust funnel 27. The exhaust funnel 27 may collect refuse, filter air for use in pressurized air source 301, or other functions. The oblique panel 26 may direct air received from the imaging assembly 202 or from another air source. Furthermore, according to at least one implementation, the exhaust funnel 27 may also include a vacuum system configured to further collect refuse material and reduce fouling of the interior of the cutting assembly 206.

In some implementations, the exhaust funnel 27 may include a pressure sink, such as a vacuum device. In some implementations, the pressure sink or vacuum device may further promote airflow both through channel 303, as well as through the imaging assembly and/or cutting assembly. The exhaust funnel 27 and pressure sink may, in some implementations, replace a pressurized air source. The exhaust funnel 27 and pressure sink may, in some implementations, act in combination with the pressurized air source. These and other aspects may be combined with other aspects to create a positive pressure cutting assembly 206 that may operate with or without a positive pressure imaging assembly.

During operation, the positive air pressure can be adjusted so as to reduce or minimize disturbance of plant structures on the agricultural product being trimmed. The agricultural product may be moved, retained in cutting position, and moved away from cutting position with conveyor chain 22.

For example, the conveyor chain may retain and convey a clamping member (e.g., 21) that retained or clamps an agricultural product.

As conveyor chain 22 moves a clamping member 21 into cutting relation with the cutting assembly 206, an idler sprocket 23 senses a location of the clamping assembly 21 and directs a signal indicating a stopping condition for the conveyor 244. As further shown, cutting disks or wheels 24 are arranged to move generally along direction or cutting path 25 into cutting relation with agricultural product 15.

In this manner, as a new agricultural product 15 to be trimmed or processed is conveyed on conveyor chain 22 towards the cutting path 25, the idler sprocket 23 may actuate the stopping condition signal. The actuation may be based on detection of a magnetic field, actuation of a limit switch, actuation of a proximity sensor, or by any other suitable manner. In one implementation, actuation of the stopping condition is based upon sensing a magnet on a spring clamping assembly 21 within the cutting path 25.

Upon receipt of the stopping condition signal, a magnetic coupler 29 arranged through floor 30 of the cutting apparatus 102 may direct a retention member 28 to retain the clamping member 21 holding the agricultural product 15. The retention member 28 and magnetic coupler 29 may also be arranged to rotate and move the agricultural product 15 during a cutting/trimming operation. In this manner, the agricultural product maybe rotated such that all exterior edges of the agricultural product can be trimmed by the cutting disks 24.

Before, during, and after the cutting operation, the image sensor 4 may capture images of the agricultural product 15. Image quality may be bolstered by an oblique panel 26 arranged to be non-reflective. For example, the oblique panel 26 may be arranged at an oblique angle compared to the central axis of the agricultural product 15. Furthermore, the oblique panel 26 may be at least partially coated in a dark pigmented coating, such as black paint.

As further shown, the cutting disks 24 may move in parallel to the mounting axis of the agricultural product 15 (e.g., up/down) and along cutting path 25. In this manner, the cutting disks 24 may follow a designated cutting profile provided by the components of FIG. 1 and system 100.

As described above, cutting apparatus 102 includes a cutting assembly 206 arranged proximate an imaging assembly 202. A conveyor assembly 204 is arranged to feed a conveyor chain 22 such that agricultural products are moved from an exterior of the cutting apparatus 102 and into cutting relation with one or more cutting disks 24. The cutting disks 24 are arranged to spin and cut away material from the agricultural product. Furthermore, before, during, and after cutting operations, an image sensor 4 is arranged to capture images of the agricultural product. Accordingly, cutting paths, silhouettes, and profiles may be determined during the cutting operation with adjustments made to ensure a properly trimmed agricultural product is output form the cutting apparatus 102.

In some implementations, the conveyer assembly 204 may include alternative conveyor systems, such as belts, cords, chains, and other suitable conveyor systems. Such conveyor systems may further include wheels, pulleys, rails, sleds, and other mechanical features to effectuate motion of a conveyor as described herein.

Hereinafter, additional detail related to clamping members are provided with reference to the different views of FIG. 7.

Clamping Members

FIG. 7A is an exploded view of a clamping member of the cutting assembly of FIG. 6A, in accordance with some implementations. FIG. 7B is a side view of the clamping member of FIG. 7A, in accordance with some implementations. FIG. 7C is a side view of an unloaded clamping member, in accordance with some implementations. FIG. 7D is a side view of a loading sequence of a clamping member, in accordance with some implementations. FIG. 7E is a side view of a loaded clamping member, in accordance with some implementations.

As shown in the multiple views A-E of FIG. 7, a clamping member 242 may include an upper housing 31 and lower housing 32. The upper housing 31 may be an upper section with pin outlet slots and spring-registration grooves arranged therein. The lower housing 32 may be a lower section with a guide hole for receiving a riser post 37.

The clamping member 242 may further include a spring 33. In some implementations, the spring 33 is a torsion spring. The torsion spring 33 may be formed of any suitable material, such as metal or an elastomeric material under torsion.

In some implementations, the spring 33 is an elastomeric member. For example, the spring 33 may be formed as a diaphragm or elastomeric bulb arranged to bias a pin (or one or more pins) as described herein.

In some implementations, the spring 33 is a leaf spring. The leaf spring 33 may be a multi-lobed leaf spring. Furthermore, the leaf spring 33 may include a central mounting hole and radially arranged pin holes. The leaf spring 33 may be formed of metal or an elastomeric material, in some implementations.

The clamping member 242 may further include a spring mount 34. The spring mount 34 may be arranged to slide over a lobe of the leaf spring 33. The spring mount 34 may be formed of plastic, for example. The spring mount 34 may be arranged to fixedly retain pin 35 perpendicular or orthogonal to a surface defined by the leaf spring 33, when the clamping member 242 is assembled (e.g., see FIG. 7B).

The pin 35 may be formed of any suitably rigid material. For example, the pin 35 may be formed of steel or stainless steel. The pin 35 may be formed of rigid plastic or a plastic compound. The pin 35 may be formed of nickel-plated steel or nickel-plated metal. The pin 35 may be formed of metal. The pin 35 may be formed of metal coated with an antistick material such as a plastic, fluoropolymer, perfluoroalkoxy (PFA), polytetrafluoroethylene (PTFE), ceramic, paint, or another suitable antistick material.

In some implementations, the pin 35 may include a sharpened point. The pin 35 may be formed of any material suitable to be sharpened, in some implementations.

In some implementations, the pin 35 may include a head portion 45 bent at approximately 90-degrees relative to the pin body.

The clamping member 242 may further include a screw or fastener 36 and riser post 37. The riser post 37 may be arranged to receive and retain the fastener 36. The fastener 36 and riser post 37 may be formed of the same or different materials. The fastener 36 and riser post 37 may be formed of metal or plastic. The fastener 36 and riser post 37 may be formed of stainless steel, steel, nickel-coated steel, brass, bronze, copper, or another suitable material. The riser post 37 may be operative to engage with a conveyor chain link such that the entire clamping assembly 242 may be conveyed within and about the cutting apparatus 102.

The clamping member 242 may further include a magnet 40 arranged to be retained by the lower housing 32 in complimentary indentations 39. Furthermore, an additional indentation 41 may be formed in the upper housing 31 for registration of a stem portion of an agricultural product.

An assembled view of the clamping member 242 is provided in FIG. 7B. As shown, pins 35 protrude upward and are arranged to engage with an internal structure of an agricultural product. Sharp points on distal ends of the pins 35 may be inserted into an unprocessed agricultural product 42 (FIG. 7D) while the entire clamping member 242 is pushed downward against a conveyor chain. The downward force 50 causes the pins 35 to move into an orthogonal relationship with a plane formed by the lower housing 32 so that the pins 35 can be more easily inserted into the agricultural product 42. Upon release of the downward force 50, the pins 35 apply a spring force 51 or a clamping force upon an interior of the agricultural product 42. In this manner, the clamping member 242 is arranged to retain the agricultural product 42 until downward force 50 is reapplied and the agricultural product is removed.

Figure 9:
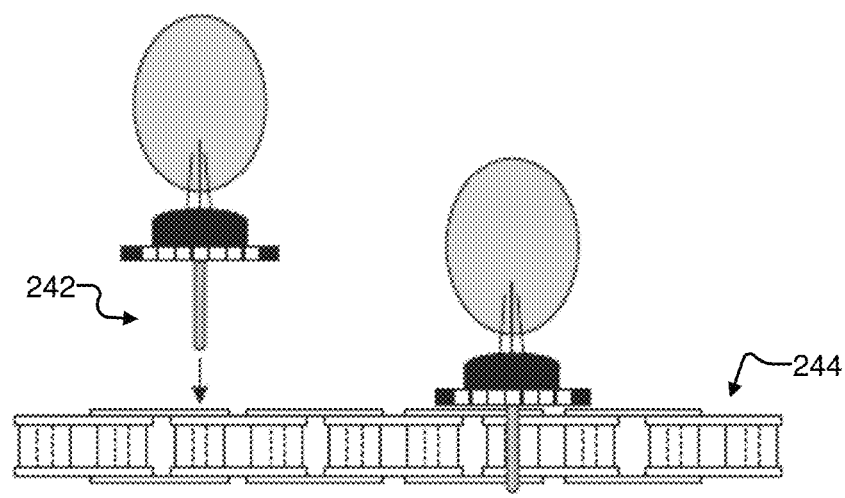
FIG. 9 illustrates a loading sequence of a conveyor with a clamping assembly, in accordance with some implementations.
Figure 10:
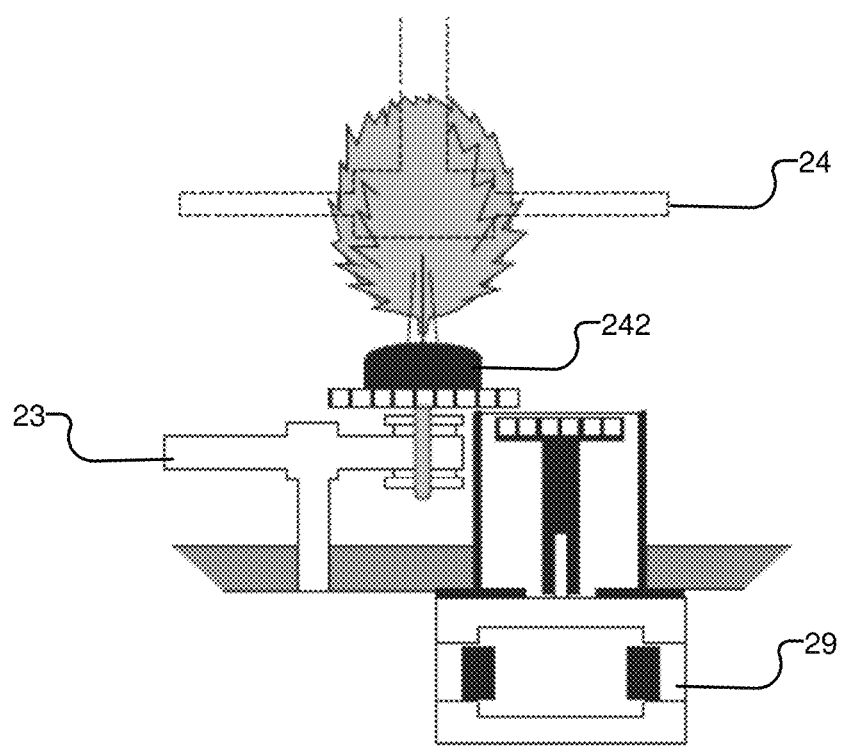
FIG. 10 is a side view of a loaded clamping member proximate a cutting blade and idler gear, in accordance with some implementations.

Hereinafter, orientation of a clamping member and cutting disks are described with reference to FIGS. 8-10.

Figure 8:
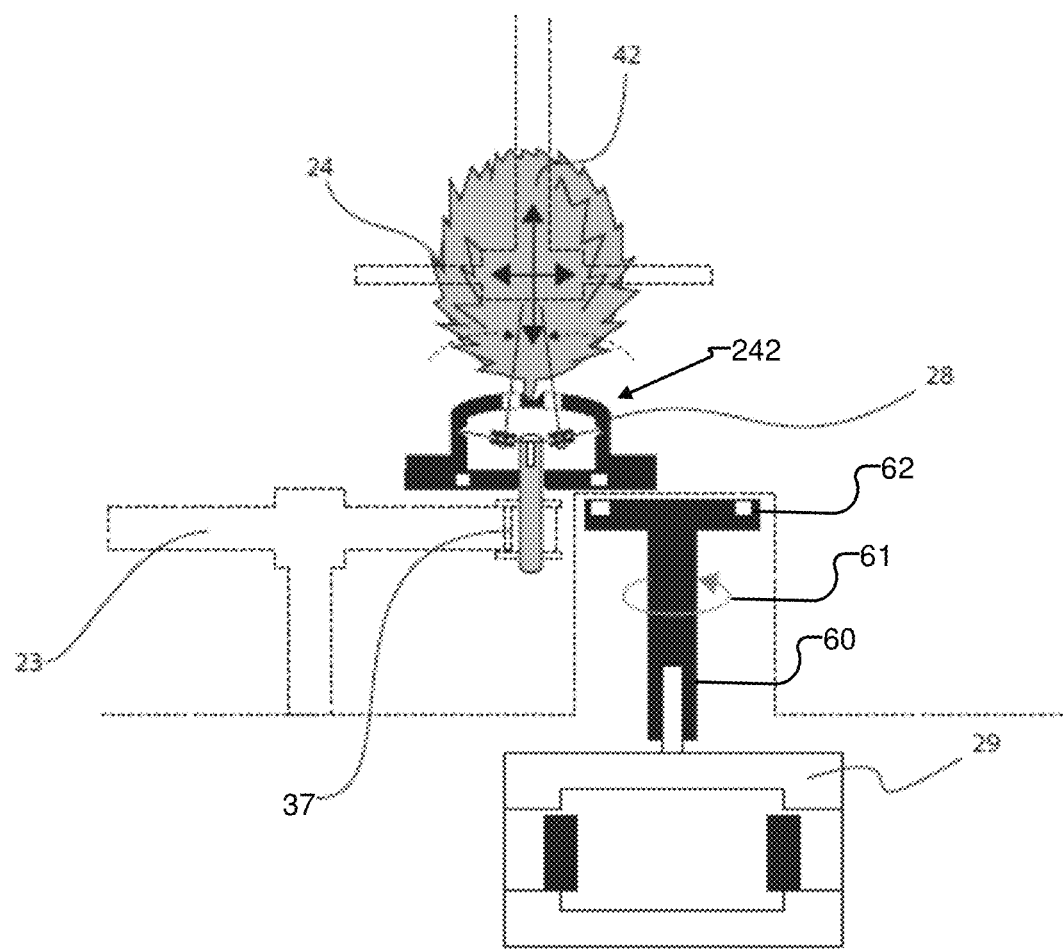
FIG. 8 illustrates a loaded clamping member proximate a cutting blade, in accordance with some implementations.

FIG. 8 illustrates a loaded clamping member proximate a cutting blade, in accordance with some implementations. As shown, the magnetic coupler 29 is arranged to rotate a magnetic member 60 while the clamping member 242 is positioned proximate thereto. The rotation of the member 60 (e.g., direction of rotation 61) causes embedded magnets 62 to move complimentary magnets 40 of the clamping member 242. Such motion causes the entire clamping assembly 242 to rotate opposite the direction 61.

In this example, the riser post 37 provides an axis for rotation within the conveyor chain and idler sprocket 23. For example, FIG. 9 illustrates a loading sequence of the loading clamping member onto the conveyor chain. As shown, multiple clamping members 242 may be loaded onto the conveyor chain and moved into cutting relation with the cutting disks 24, with idler sprocket 23 sensing placement of the cutting relationship.

It can be appreciated that the magnetic coupler (32, FIG. 7A) resides at a different elevation along the shaft (37, 7A) in which case the motor coupler (62, FIG. 8) would be repositioned to effectively couple. Other similar magnetic couplings are applicable, as well as mechanical couplings involving gear or friction interfaces, for example.

While 242 may be removeable, to aid in cleaning for example, it can be appreciated that 242 may remain permanently attached to the conveyor and still accomplish the intended function.

During rotation and/or during pauses in rotation, the cutting disk 24 removes material from the agricultural product 42 according to a cut profile provided by system 100. For example, FIG. 10 is a side view of a loaded clamping member proximate a cutting blade and idler gear, in accordance with some implementations.

As described above, clamping members 242 may include an upper housing, lower housing, and spring assemblies therein arranged to provide a clamping force internal to an agricultural product. The clamping force may be applied automatically upon release of a downward, loading force. The clamping force is provided by rigid pins that protrude from the upper housing and move based upon manipulation of the clamping member 242 against a conveyor chain or other body (e.g., using a hand, table, flat surface, or other body). For example, clamping members may be loaded while off of the conveyor chain and placed thereon, or may be loaded while already placed on the conveyor chain. Actuation of the clamping member may be manual or automated, in some implementations.

Hereinafter, methods of operation and functions of computer-assisted and automated trimming and training componentry are described in detail with reference to FIG. 11.

Automated Trimming Methods

Figure 11:
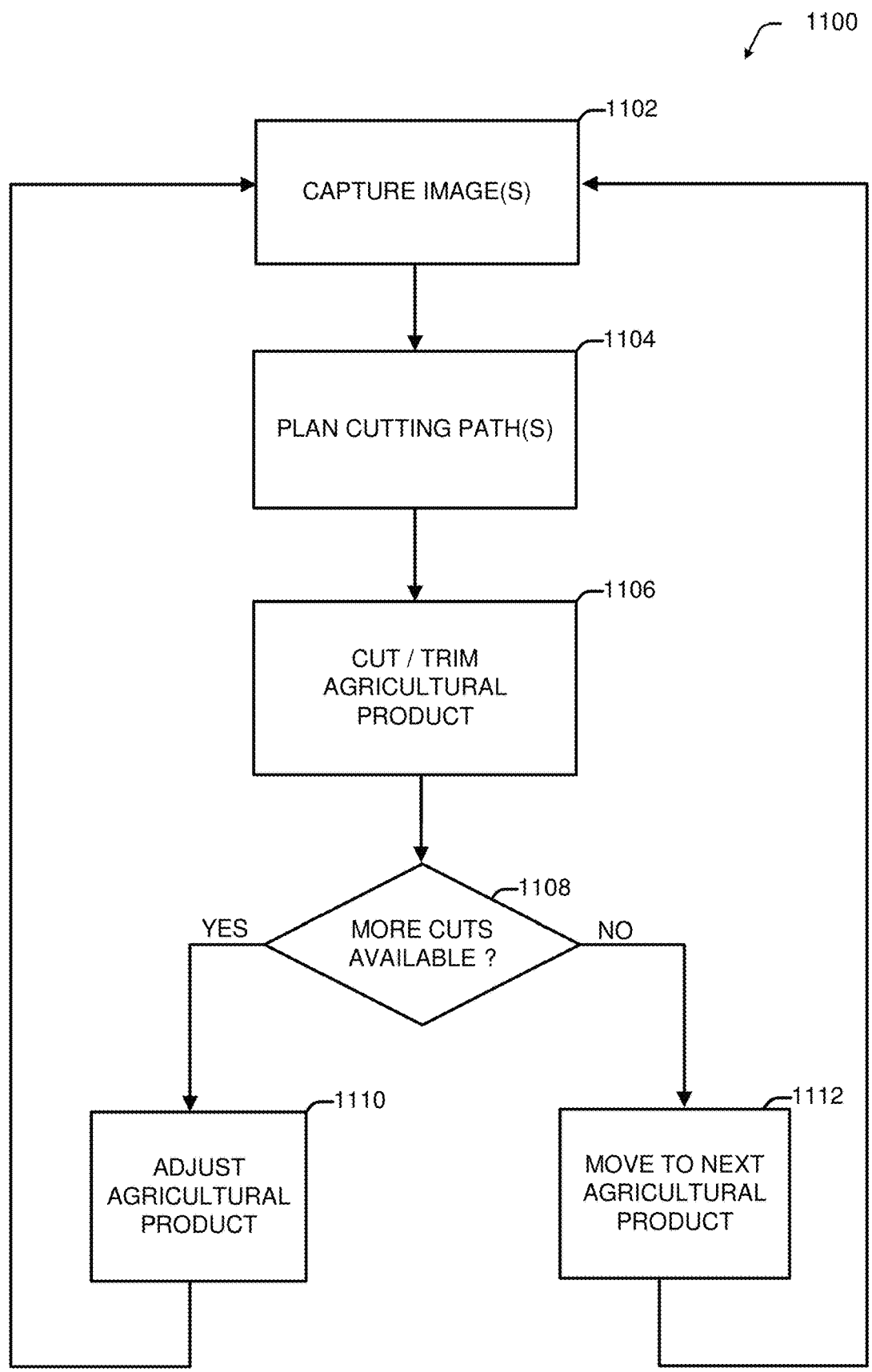
FIG. 11 is a flowchart illustrating an example method of computer-assisted and automatic trimming of agricultural products, in accordance with some implementations.

FIG. 11 is a flowchart illustrating an example method 1100 of computer-assisted and automatic trimming of agricultural products, in accordance with some implementations.

In some implementations, method 1100 can be implemented, for example, on an automated physical component (e.g., see FIG. 1) and/or cloud and computing components (e.g., see FIG. 1), and/or a combination of both automated physical components (such as the automated cutting apparatus 102) and server devices (such as the cloud and computing components). In some implementations, some or all of the method 1100 can be implemented on one or more client devices, on one or more developer devices, or on one or more server device(s), and/or on a combination of developer device(s), server device(s) and client device(s). In described examples, the implementing system includes one or more digital processors or processing circuitry ("processors"), and one or more storage devices (e.g., a data store or other storage). In some implementations, different components of one or more servers and/or clients can perform different blocks or other parts of the method 1100. In some examples, a first device is described as performing blocks of method 1100. Some implementations can have one or more blocks of method 1100 performed by one or more other devices (e.g., other client devices or server devices) that can send results or data to the first device.

The method 1100 begins at block 1102.

At block 1102, images of a clamped agricultural product in cutting relation with a cutting assembly are captured by an imaging assembly. For example, cutting assembly 206 and imaging assembly 202 may be used to capture images of the agricultural product. The method 1100 continues at block 1104.

At block 1104, cutting paths for one or more spinning blades are planned. For example, the motion planning module 148 operating with the image processing module 146 may determine one or more cutting paths, desired profiles of cuts, cutting silhouettes, or other similar plans. In at least one implementation, the cutting paths are programmatically applied in a manner similar to computer numerical control (CNC) and may be formed in any suitable computer-executable code. The CNC code may take many forms and may be tailored for individual agricultural products by the system 100. Block 1104 is followed by block 1106.

At block 1106, trimming of the agricultural product commences with a series of cuts based upon the cutting paths. The series of cuts may be facilitated by the one or more spinning cutting disks. It is noted that block 1106 may also include rotating or spinning the clamping member (and therefore the agricultural product). Block 1106 is followed by block 1108.

At block 1108, a determination is made as to whether additional cuts are available or if additional portions of the agricultural product should be removed. If additional cuts are possible or available, the method 1100 continues at block 1110.

At block 1110, the agricultural product may be adjusted. For example, the clamping member 242 may be rotated or otherwise adjusted. Subsequently, the method 1100 iterates through blocks 1102-1110 until no further cuts may be available.

If no further cuts may be available, the trimmed agricultural product (e.g., an agricultural product with no more available cuts) may be moved away. In some instances, a human operator may set the trimmed product aside for further evaluation or additional manual trimming. In some instances, particularly if the trimmed product is verifiable as having no more available cuts, the spent product may be discarded (e.g., refuse) or collected, and/or the trimmed product may be moved away for other purposes.

For example, other purposes of the trimmed agricultural product may include primary, secondary, and/or tertiary packaging. Other purposes may also include evaluation, grading, and/or inspection. Other purposes may also include further processing.

Thereafter, the method 1100 may continue at block 112 wherein a new agricultural product may be moved into cutting relation with the cutting disks. The method 1100 may be repeated or iterated until a stopping criterion is met.

Other implementation features may also be applicable. For example, blocks 1102-1112 can be performed (or repeated) in a different order than described above and/or one or more steps of method 1100 and/or of any other method described herein can be omitted, supplemented with other steps, modified, combined, etc. Furthermore, portions or the entirety of blocks 1102-1112 may be iterated until a user finishes and/or exits a trimming procedure. Similarly, portions or the entirely of blocks 1102-1112 may be iterated until a user completes an entire agricultural product is reduced to multiple useable portions, that are sorted, with some portions being discarded. Other changes may also be applicable.

Automated Processing Methods

Figure 12:
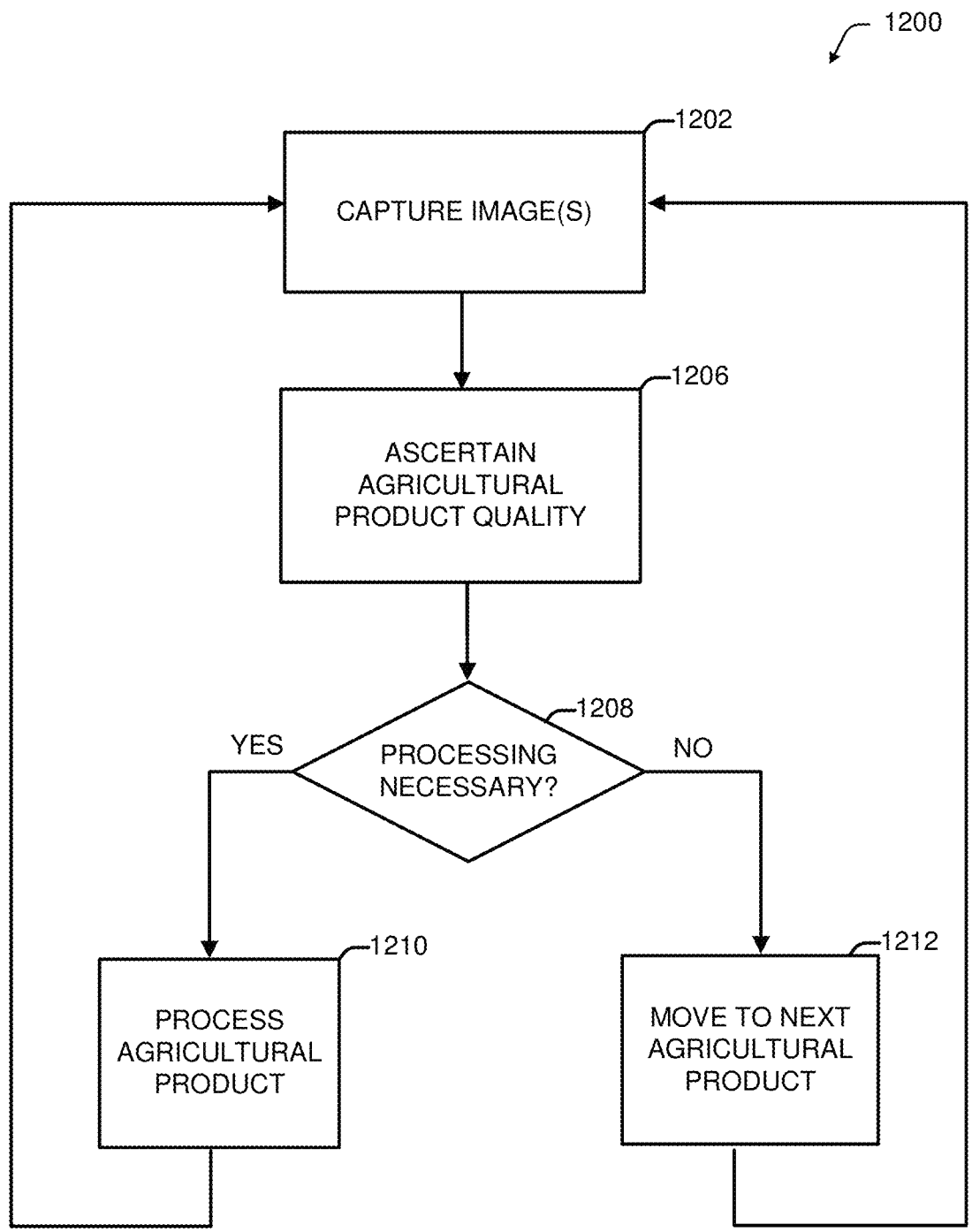
FIG. 12 is a flowchart illustrating an example method of computer-assisted and automatic processing of agricultural products, in accordance with some implementations.

FIG. 12 is a flowchart illustrating an example method 1200 of computer-assisted and automatic processing of agricultural products, in accordance with some implementations.

In some implementations, method 1200 can be implemented, for example, on an automated physical component (e.g., see FIG. 1) and/or cloud and computing components (e.g., see FIG. 1), and/or a combination of both automated physical components (such as the automated cutting apparatus 102, imaging assembly 202, etc.) and server devices (such as the cloud and computing components). In some implementations, some or all of the method 1200 can be implemented on one or more client devices, on one or more developer devices, or on one or more server device(s), and/or on a combination of developer device(s), server device(s) and client device(s). In described examples, the implementing system includes one or more digital processors or processing circuitry ("processors"), and one or more storage devices (e.g., a data store or other storage). In some implementations, different components of one or more servers and/or clients can perform different blocks or other parts of the method 1200. In some examples, a first device is described as performing blocks of method 1200. Some implementations can have one or more blocks of method 1200 performed by one or more other devices (e.g., other client devices or server devices) that can send results or data to the first device.

The method 1200 begins at block 1202.

At block 1202, images of a clamped agricultural product in imaging relation with an imaging assembly are captured by the imaging assembly. For example, imaging assembly 202 may be used to capture images of the agricultural product. The method 1200 continues at block 1206.

At block 1206, quality of the agricultural product is ascertained. For example, one or more images captured at block 1202 may be used to identify one or more contaminants. The contaminants may include, for example, mold, mildew, powdery mildew, insects, insect eggs, or other contaminants. The contaminants may also include indications of contamination without direct imaging of those contaminants. For example, the contaminants may also include viruses or bacteria that may not be imaged directly, but plant or agricultural product structures affected by viruses or bacteria may be ascertained through image analysis.

Block 1206 may be performed by a machine learning model or artificial intelligence algorithm trained to output data indicative of agricultural product quality. For example, a machine learning model may be trained using a plurality of records. The plurality of records may include labeled images of healthy agricultural product, unhealthy agricultural products, and other images. The labeled images may include labels identifying healthy and unhealthy plant structures. Furthermore, the labeled images may be used in a supervised or semi-supervised learning process to train the machine learning mode.

The machine learning model may process or analyze the images captured at block 1202 to determine that an agricultural product necessitates further processing. Block 1206 is followed by block 1208.

At block 1108, a determination is made as to whether additional processing of the agricultural product is necessary, needed, desirable, or otherwise indicated. For example, a machine learning model and/or visual analysis of the agricultural product may be performed. If additional processing is indicated, the method 1200 continues at block 1210.

At block 1210, the agricultural product may be further processes. For example, the clamping member 242 may be rotated or otherwise adjusted while an illumination source of ultraviolet light is activated. The ultraviolet light may be incident upon the agricultural product while the clamping member 242 rotates the agricultural product. The incident ultraviolet light may disrupt contaminants and/or render contaminates inert and/or reduce contaminates. Subsequently, the method 1200 iterates through blocks 1202-1210 until no further processing is indicated. The method 1200 may also iterate until no further processing is possible. The method 1200 may also iterate until no further processing is available due to deterioration of the agricultural product. Other iterative stopping conditions may be applicable.

If no further processing is indicated, the processed agricultural product (e.g., an agricultural product with no more indicated processing) may be moved away from the imaging relation. In some instances, a human operator may set the processed product aside for further evaluation or additional manual processing.

Thereafter, the method 1200 may continue at block 1212 wherein a new agricultural product may be moved into imaging relation with the imaging assembly. The method 1200 may be repeated or iterated until a stopping criterion is met.

Other implementation features may also be applicable. For example, blocks 1202-1212 can be performed (or repeated) in a different order than described above and/or one or more steps of method 1200 and/or of any other method described herein can be omitted, supplemented with other steps, modified, combined, etc. Furthermore, portions or the entirety of blocks 1202-1212 may be iterated until a user finishes and/or exits a processing procedure. Similarly, portions or the entirely of blocks 1202-1212 may be iterated until a user indicates an entire agricultural product is processed to mitigate, reduce, or minimize contaminates. Other changes may also be applicable.

Hereinafter, a description of various components of computing devices that may perform some or all of the functionality, methods, and algorithms described herein, is presented with reference to FIG. 13.

Computing Devices

Figure 13:
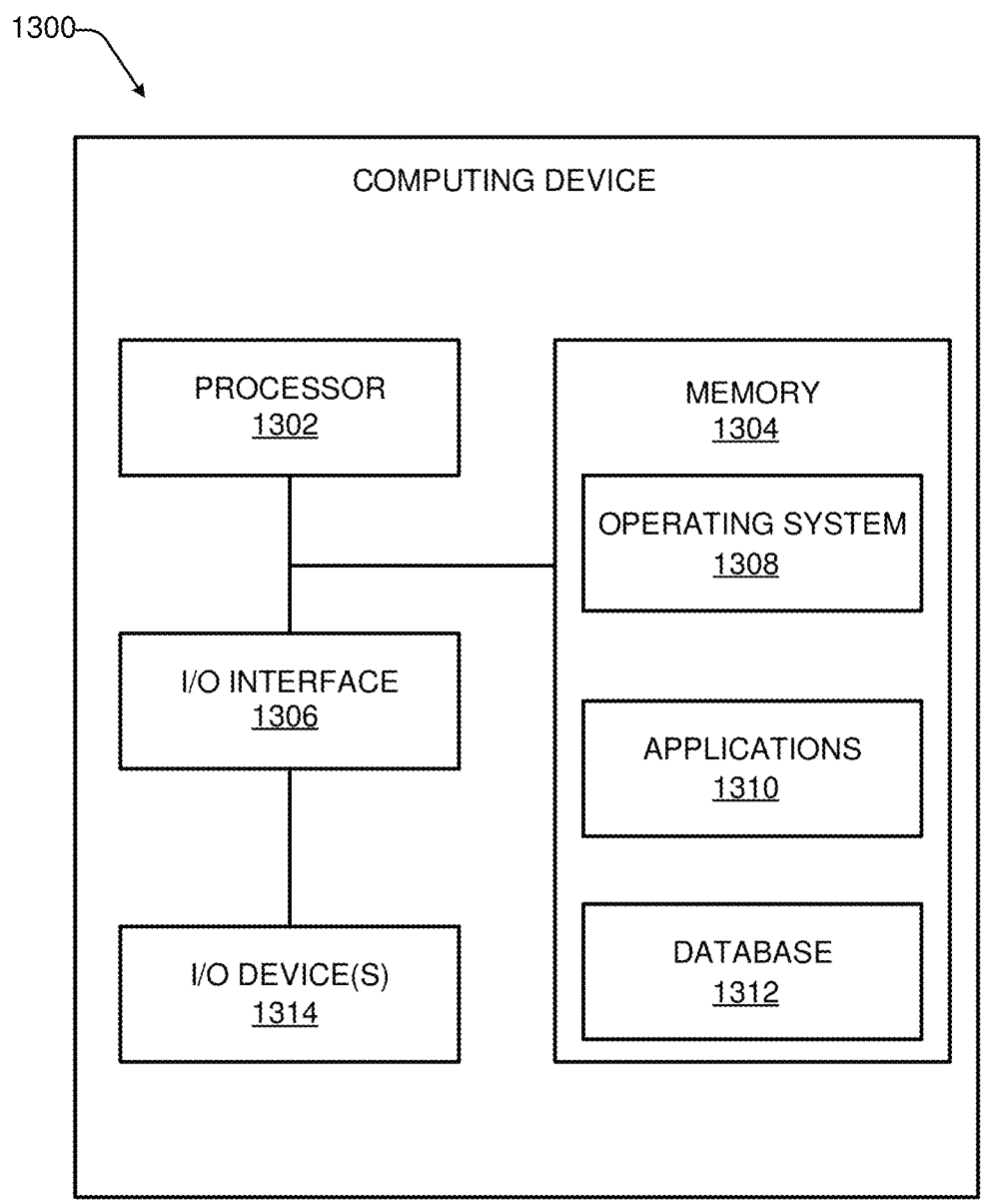
FIG. 13 is a block diagram illustrating an example computing device, in accordance with some implementations.

FIG. 13 is a block diagram of an example computing device 1300 which may be used to implement one or more features described herein, in accordance with some implementations. In one example, device 1300 may be used to implement a computer device, and perform appropriate operations as described herein. Computing device 1300 can be any suitable computer system, server, or other electronic or hardware device. For example, the computing device 1300 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 1300 includes a processor 1302, a memory 1304, input/output (I/O) interface 1306, and audio/video input/output devices 1314 (e.g., display screen, touchscreen, display goggles or glasses, audio speakers, headphones, microphone, etc.).

Processor 1302 can be one or more processors and/or processing circuits to execute program code and control basic operations of the device 1300. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1304 is typically provided in device 1300 for access by the processor 1302, and may be any suitable processor-readable storage medium, e.g., random access memory (RAM), read-only memory (ROM), electrical erasable read-only memory (EEPROM), flash memory, etc., suitable for storing instructions for execution by the processor, and located separate from processor 1302 and/or integrated therewith. Memory 1304 can store software operating on the server device 1300 by the processor 1302, including an operating system 1308, software application 1310 and associated data 1312. In some implementations, the applications 1310 can include instructions that enable processor 1302 to perform the functions described herein. Software application 1310 may include some or all of the functionality required to capture images of agricultural products and determine cutting paths associated therewith. In some implementations, one or more portions of software application 1310 may be implemented in dedicated hardware such as an application-specific integrated circuit (ASIC), a programmable logic device (PLD), a field-programmable gate array (FPGA), a machine learning processor, etc. In some implementations, one or more portions of software application 1310 may be implemented in general purpose processors, such as a central processing unit (CPU) or a graphics processing unit (GPU). In various implementations, suitable combinations of dedicated and/or general purpose processing hardware may be used to implement software application 1310.

For example, software application 1310 stored in memory 1304 can include instructions for capturing images, processing images, determining cutting profiles, determining cutting paths, and directing a cutting assembly of a plant cutting apparatus to trim an agricultural product. Any of software in memory 1304 can alternatively be stored on any other suitable storage location or computer-readable medium. In addition, memory 1304 (and/or other connected storage device(s)) can store instructions and data used in the features described herein. Memory 1304 and any other type of storage (magnetic disk, optical disk, magnetic tape, or other tangible media) can be considered "storage" or "storage devices."

I/O interface 1306 can provide functions to enable interfacing the server device 1300 with other systems and devices. For example, network communication devices, storage devices (e.g., memory and/or data store 110), and input/output devices can communicate via interface 1306. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 13 shows one block for each of processor 1302, memory 1304, I/O interface 1306, software blocks 1308 and 1310, and database 1312. These blocks may represent one or more processors or processing circuitries, operating systems, memories, I/O interfaces, applications, and/or software modules. In other implementations, device 1300 may not have all of the components shown and/or may have other elements including other types of elements instead of, or in addition to, those shown herein. While the online server 102 are described as performing operations as described in some implementations herein, any suitable component or combination of components of online server 102, or similar system, or any suitable processor or processors associated with such a system, may perform the operations described.

A user device can also implement and/or be used with features described herein. Example user devices can be computer devices including some similar components as the device 1300, e.g., processor(s) 1302, memory 1304, and I/O interface 1306. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 1314, for example, can be connected to (or included in) the device 1300 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., method 1100) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. field-programmable gate array (FPGA), complex programmable logic device), general purpose processors, graphics processors, application specific integrated circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the live feedback data for output (e.g., for display). In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those of ordinary skill in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. An imaging assembly, comprising:
    an outer tube;
    an inner tube arranged within the outer tube and defining an air channel, wherein the air channel is configured to direct pressurized air from a first distal end of the outer tube to a second distal end of the outer tube;
    an image sensor arranged proximate the first distal end of the outer tube and configured to receive light from the second distal end of the outer tube, wherein the image sensor is further configured to capture images of an agricultural product arranged proximate the second distal end of the outer tube;
    an illumination source arranged proximate the image sensor and configured to illuminate in a direction of the second distal end of the outer tube; and
    an air source in fluid communication with the first distal end of the outer tube.

2. The imaging assembly of claim 1, wherein the outer tube comprises an inner surface that is coated in black paint.

3. The imaging assembly of claim 1, wherein the inner tube comprises an inner surface that is reflective.

4. The imaging assembly of claim 1, further comprising an optical connector arranged on a first distal end of the inner tube, wherein the optical connector is operative to support the image sensor.

5. The imaging assembly of claim 4, wherein the optical connector comprises a plurality of baffles arranged about an axis collinear with a central axis of both the inner tube and the outer tube.

6. The imaging assembly of claim 1, wherein the image sensor is configured to process light in both visible and infrared wavelengths, and wherein the image sensor comprises an ultraviolet filter arranged thereon.

7. The imaging assembly of claim 6, wherein the illumination source is configured to illuminate with visible, infrared, and ultraviolet light, and wherein the ultraviolet filter is configured to block the ultraviolet light.

8. The imaging assembly of claim 1, wherein the illumination source comprises a plurality of individual light sources arranged about a central axis of the image sensor.

9. The imaging assembly of claim 1, further comprising a conveyor arranged proximate the second distal end of the outer tube, and wherein the conveyor comprises a conveyor chain having a plurality of chain links.

10. The imaging assembly of claim 9, further comprising a clamping member arranged on one chain link of the plurality of chain links, wherein the clamping member is configured to retain and rotate the agricultural product.

11. The imaging assembly of claim 10, further comprising a cutting assembly arranged proximate the conveyor, wherein the cutting assembly is configured to automatically remove plant material from the agricultural product.

12. The imaging assembly of claim 11, wherein the cutting assembly comprises a cutting disk, an oblique panel arranged in an oblique relationship to a central axis of the cutting disk, and an exhaust funnel arranged proximate the oblique panel, and wherein:
    the cutting disk is configured to spin on the central axis of the cutting disk and to remove the plant material;

the oblique panel is configured to direct airflow from the air channel; and the exhaust funnel is configured to capture the plant material removed from the agricultural product.

13. The imaging assembly of claim 10, wherein the clamping member comprises:
   an upper housing;
   a lower housing affixed to the upper housing;
   an interior cavity defined by the upper housing and the lower housing;
   two or more pins arranged to protrude from the interior cavity and through an upper surface of the upper housing; and
   a leaf spring arranged within the interior cavity and against the two or more pins.

14. The imaging assembly of claim 13, wherein downward force applied to the clamping member causes a clamping force of the two or more pins to be released.

15. The imaging assembly of claim 14, wherein upward motion of the clamping assembly causes a clamping force of the two or more pins.

16. The imaging assembly of claim 1, further comprising a plurality of spacers arranged to support the inner tube within the outer tube.

17. The imaging assembly of claim 1, further comprising a light filter arranged in an image receiving path of the image sensor.

18. The imaging assembly of claim 1, further comprising an air outlet nozzle arranged on an interior surface of the outer tube proximate the second distal end of the outer tube.

19. A plant cutting apparatus, comprising:
   a cutting assembly arranged to remove plant material from an agricultural product;
   a conveyor assembly arranged proximate the cutting assembly and configured to convey the agricultural product from an exterior of the cutting assembly into cutting relation with the cutting assembly; and
   an imaging assembly, wherein the imaging assembly comprises:
      an outer tube;
      an inner tube arranged within the outer tube and defining an air channel, wherein the air channel is configured to direct pressurized air from a first distal end of the outer tube to a second distal end of the outer tube;
      an image sensor arranged proximate the first distal end of the outer tube and configured to receive light from the second distal end of the outer tube, wherein the image sensor is further configured to capture images of the agricultural product;
      an illumination source arranged proximate the image sensor and configured to illuminate in a direction of the second distal end of the outer tube; and
      an air source in fluid communication with the first distal end of the outer tube.

20. A plant cutting apparatus, comprising:
   a cutting assembly arranged to remove plant material from an agricultural product;
   a conveyor assembly arranged proximate the cutting assembly and configured to convey the agricultural product on a conveyor into cutting relation with the cutting assembly, wherein the cutting assembly comprises a clamping member arranged on the conveyor, wherein the clamping member comprises:
      an upper housing;
      a lower housing affixed to the upper housing;
      an interior cavity defined by the upper housing and the lower housing;
      two or more pins arranged to protrude from the interior cavity and through an upper surface of the upper housing;
      a leaf spring arranged within the interior cavity and against the two or more pins; and
   an imaging assembly, wherein the imaging assembly comprises:
      an outer tube;
      an inner tube arranged within the outer tube and defining an air channel, wherein the air channel is configured to direct pressurized air from a first distal end of the outer tube to a second distal end of the outer tube;
      an image sensor arranged proximate the first distal end of the outer tube and configured to receive light from the second distal end of the outer tube, wherein the image sensor is further configured to capture images of the agricultural product;
      an illumination source arranged proximate the image sensor and configured to illuminate in a direction of the second distal end of the outer tube; and
      an air source in fluid communication with the first distal end of the outer tube.

* * * * *